United States Patent
Eguchi et al.

(10) Patent No.: US 7,356,399 B2
(45) Date of Patent: Apr. 8, 2008

(54) FAILURE DETERMINATION SYSTEM FOR STEPLESS SPEED CHANGER AND FAILURE DETERMINATION DEVICE FOR START CLUTCH

(75) Inventors: Takahiro Eguchi, Saitama-ken (JP); Ukyo Ogata, Saitama-ken (JP); Takahiro Matsuda, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 10/543,313

(22) PCT Filed: Jan. 28, 2004

(86) PCT No.: PCT/JP2004/000744

§ 371 (c)(1), (2), (4) Date: Mar. 16, 2006

(87) PCT Pub. No.: WO2004/068003

PCT Pub. Date: Aug. 12, 2004

(65) Prior Publication Data

US 2006/0169036 A1    Aug. 3, 2006

(30) Foreign Application Priority Data

Jan. 29, 2003  (JP)  ............................. 2003-021221
Jan. 29, 2003  (JP)  ............................. 2003-021222

(51) Int. Cl.
G06F 7/00   (2006.01)
G06F 17/00  (2006.01)
G06F 19/00  (2006.01)

(52) U.S. Cl. .................. 701/61; 192/85 R; 192/103 F; 73/168; 73/1.01; 477/46; 477/48; 477/50

(58) Field of Classification Search ................ 701/61; 73/168, 1.01; 477/46, 48, 50; 192/85 R, 192/103 F See application file for complete search history.

(56) References Cited

U.S. PATENT DOCUMENTS

| | | | | |
|---|---|---|---|---|
| 4,857,034 A | * | 8/1989 | Kouno et al. | ................. 474/28 |
| 4,967,621 A | * | 11/1990 | Soga et al. | ................... 477/49 |
| 5,052,247 A | * | 10/1991 | Kato et al. | .................... 477/49 |

(Continued)

FOREIGN PATENT DOCUMENTS

CN     1153914 C  *  6/2004

(Continued)

OTHER PUBLICATIONS

Reliability testing for customer satisfaction attributes, Plotkin, C.W.; Moon, K.S.; Reliability and Maintainability, 2004 Annual Symposium—RAMS, 2004 pp. 280-286, Digital Object Identifier 10.1109/RAMS.2004.1285461.*

(Continued)

*Primary Examiner*—Cuong Nguyen
(74) *Attorney, Agent, or Firm*—Arent Fox LLP

(57) ABSTRACT

There is provided a failure determination system for a continuously variable transmission of a belt type, which is capable of determining failure of control valves for performing speed varying operation, and enhancing maintainability. An ECU controls a transmission ratio of the transmission to a fixation-determining LOW-side range when the vehicle is standing. When the transmission ratio during stoppage of the vehicle is within a stop-time OD-side range if engine torque$\geq$OD-time DR-side reference torque and at the same time the transmission ratio<DN-side reference value hold, the ECU determines that the DR solenoid valve is faulty, and if the throttle valve opening$\geq$OD-side reference value, the transmission ratio$\geq$DN-side reference value, and at the same time a vehicle speed<OD-side reference value hold, the ECU determines that the DN solenoid valve is faulty.

9 Claims, 22 Drawing Sheets

U.S. PATENT DOCUMENTS

| | | | | |
|---|---|---|---|---|
| 5,092,198 | A * | 3/1992 | Morishige et al. | 477/46 |
| 5,157,992 | A * | 10/1992 | Hayashi et al. | 477/40 |
| 5,669,846 | A * | 9/1997 | Moroto et al. | 475/211 |
| 6,042,501 | A * | 3/2000 | Yamamoto | 477/48 |
| 6,077,187 | A * | 6/2000 | Suzuki et al. | 477/48 |
| 6,120,413 | A * | 9/2000 | Kawamura | 477/159 |
| 6,135,915 | A * | 10/2000 | Aoki et al. | 477/43 |
| 6,243,638 | B1 * | 6/2001 | Abo et al. | 701/51 |
| 6,533,702 | B1 * | 3/2003 | Asyama et al. | 477/45 |
| 2006/0169036 | A1 * | 8/2006 | Eguchi et al. | 73/168 |

FOREIGN PATENT DOCUMENTS

| | | | |
|---|---|---|---|
| EP | 621421 A1 * | 10/1994 | |
| EP | 940605 A2 * | 9/1999 | |
| JP | 63031835 A * | 2/1988 | |
| JP | 63074736 A * | 4/1988 | |
| JP | 02201021 A * | 8/1990 | |
| JP | 05118420 A * | 5/1993 | |
| JP | 06174068 A * | 6/1994 | |
| JP | 06201001 A * | 7/1994 | |
| JP | 06288451 A * | 10/1994 | |
| JP | 11236965 A * | 8/1999 | |
| JP | 11247981 A * | 9/1999 | |
| JP | 11-280883 A | 10/1999 | |
| JP | 3461329 B2 * | 10/2003 | |

OTHER PUBLICATIONS

Design of a high-impact survivable robot, O'Halloran, D.; Wolf, A.; Choset, H.; Robotics and Automation, 2004. Proceedings. ICRA '04. 2004 IEEE International Conference on, vol. 4, Apr. 26-May 1, 2004 pp. 3551-3558 vol. 4, Digital Object Identifier 10.1109/ROBOT.2004.1308803.*

Use of accelerated life tests on transmission belts for predicting product life, identifying better designs, materials and suppliers Jayatilleka, S.; Okogbaa, G.; Reliability and Maintainability Symposium, 2003. Annual, Jan. 27-30, 2003 pp. 101-105.*

The direct transmission philosophy, Vines, G.; Precision Motion Control in Robotics and Machine Drives, IEE Colloquium on Nov. 22, 1994 pp. 5/1-5/4.*

Dairy processing site performance improvement using reliability centered maintenance, Arthur, N.; Reliability and Maintainability, 2004 Annual Symposium—RAMS, 2004 pp. 521-527, Digital Object Identifier 10.1109/RAMS.2004.1285500.*

T2 ACSR conductors: lessons learned, Vogt, M.W.; Industry Applications Magazine, IEEE, vol. 4, Issue 3, May-Jun. 1998 pp. 37-39, Digital Object Identifier 10.1109/2943.667908.*

T2 ACSR conductors: lessons learned, Vogt, M.W.; Rural Electric Power Conference, 1997. Papers Presented at the 41st Annual Conference, Apr. 20-22, 1997 pp. C1-1-5, Digital Object Identifier 10.1109/REPCON.1997.595615.*

Safe arm with MR-based passive compliant joints and visco-elastic covering for service robot applications, Yoon, S.-S.; Kang, S.; Kim, S.-J.; Kim, Y.-H.; Kim, M.; Lee, C.-W.; Intelligent Robots and Systems, 2003. (IROS 2003). Proceedings. 2003 IEEE/RSJ International Conference on, vol. 3, Oct. 27-31, 2003 pp. 2191-2196 vol. 3 Digital Object I.*

* cited by examiner

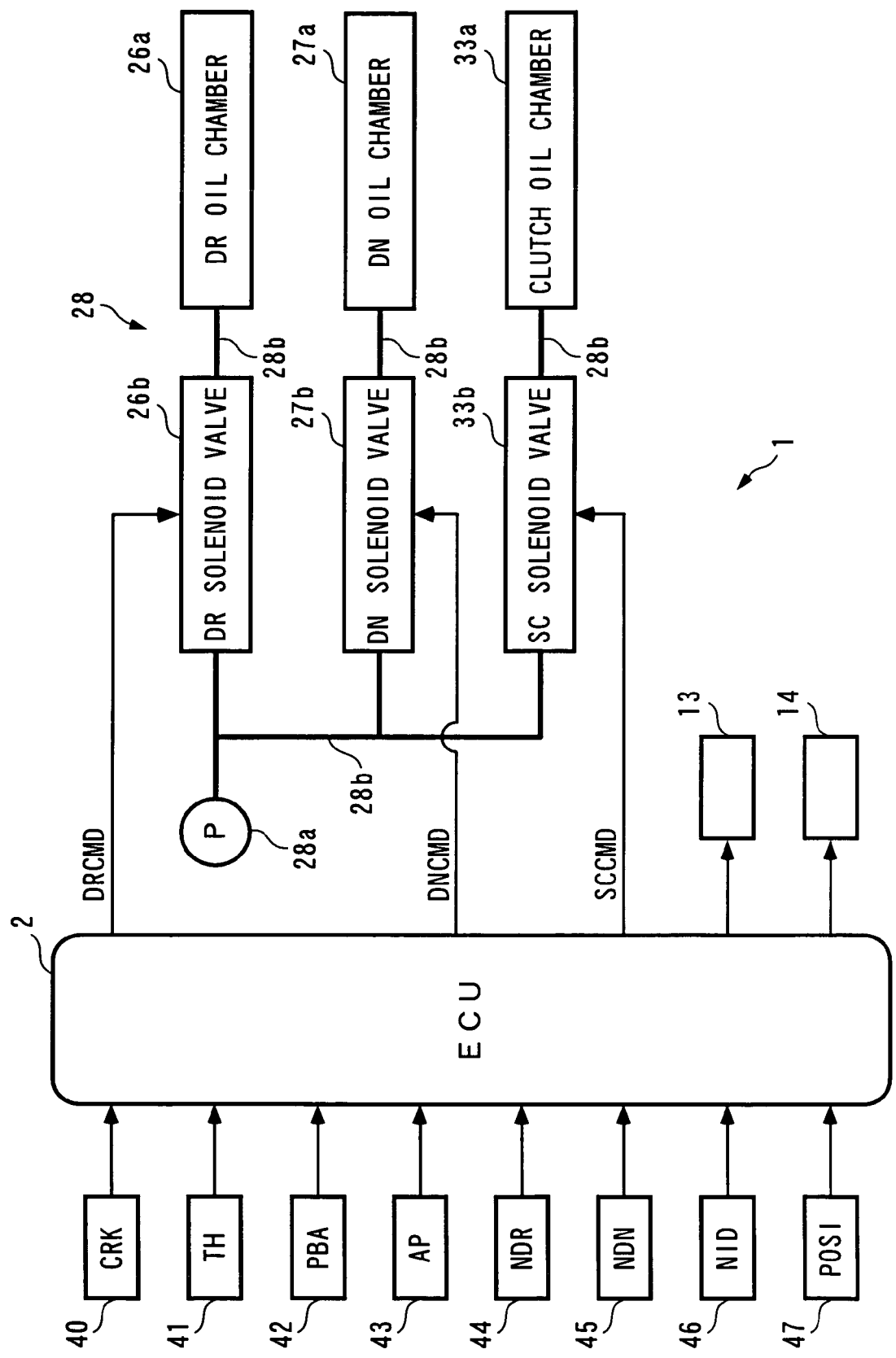

F I G. 1 9
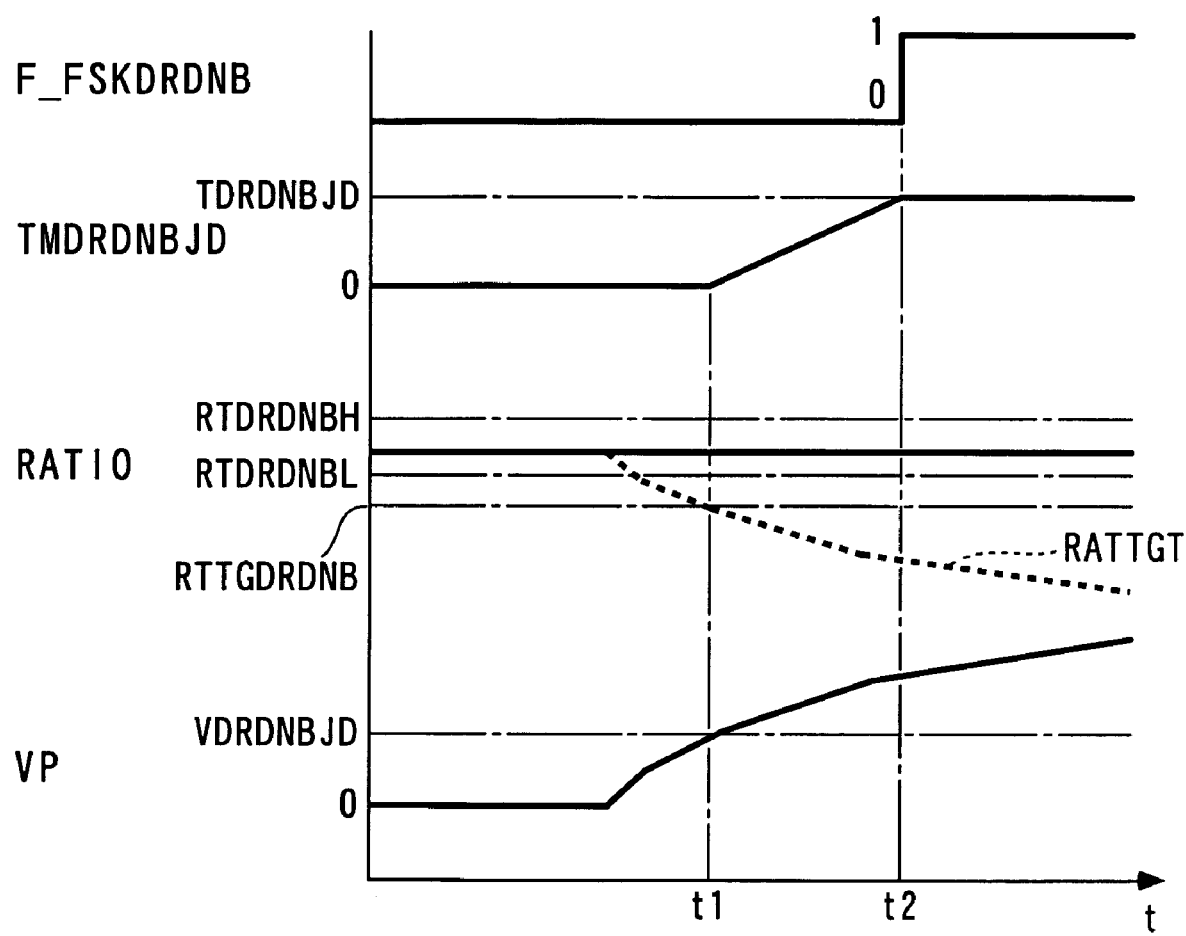

FAILURE DETERMINATION SYSTEM FOR STEPLESS SPEED CHANGER AND FAILURE DETERMINATION DEVICE FOR START CLUTCH

CROSS-REFERENCE TO RELATED APPLICATION

This application is a National Stage entry of International Application No. PCT/JP2004/000744 filed Jan. 28, 2004, the entire specification claims and drawings of which are incorporated herewith by reference.

BACKGROUND OF THE INVENTION

1. Field of the Invention

This invention relates to a failure determination system for a continuously variable transmission of a belt type which has a belt stretched between two pulleys of a variable pulley width type, and performs speed varying operation by varying the pulley widths of the pulleys by oil pressure supplied thereto via control valves, and a failure determination system for a start clutch disposed between a transmission and drive wheels of a vehicle and having the engaging force thereof controlled by oil pressure supplied thereto via a control valve, and more particularly to determination of failure of these control valves.

2. Description of the Related Art

Conventionally, a failure determination system for a continuously variable transmission has been disclosed e.g. in Japanese Laid-Open Patent Publication (Kokai) No. S60-157553 (pages 2-12 and FIG. 13). The continuously variable transmission is installed on a vehicle, and comprised of a drive pulley of a variable pulley width type to which torque from an engine is input, a driven pulley of a variable pulley width type connected to the drive pulley via a belt, a hydraulic circuit including three solenoid valves for controlling oil pressure supplied to the drive pulley and the driven pulley, and a controller connected to the three solenoid valves via three electric drive circuits. In the continuously variable transmission, command signals from the controller are input to the solenoid valves via the electric drive circuits, respectively, to control the solenoid valves, thereby supplying oil pressure from the hydraulic circuit to the drive pulley and the driven pulley to change the pulley widths of the pulleys, whereby the speed varying operation of the continuously variable transmission is carried out.

Further, the failure determination system includes two rotational speed sensors for detecting the respective rotational speeds of the drive pulley and the driven pulley. In the failure determination system, the inputs and outputs of the electric drive circuits are compared with each other during travel of the vehicle, whereby it is determined whether or not a disconnection or a short circuit has occurred in the solenoids of two of the solenoid valves for supplying oil pressure to the drive pulley (step SR13 in FIG. 13 of the publication). Further, during travel of the vehicle, the actual transmission ratio of the continuously variable transmission is calculated based on signals delivered from the two rotational speed sensors, and determination of whether the speed varying operation of the continuously variable transmission is faulty is executed based on the difference between the detected actual transmission ratio and a target transmission ratio (steps SR16 to SR19 in FIG. 13 of the publication).

According to the conventional failure determination system, the determination of whether or not a disconnection or a short circuit has occurred in the solenoids of the solenoid valves is performed separately from the determination of faulty speed varying operation of the continuously variable transmission, and hence it is possible to discriminate failure of the solenoids and failure of the hydraulic circuit of the continuously variable transmission from each other. However, each solenoid valve is comprised of a combination of a solenoid and hydraulic circuit components, such as a valve element, not only the solenoid but also the hydraulic circuit-components can become faulty. For example, there are cases in which the valve element is fixed in the open-state or the closed-state, e.g. due to a foreign matter contained in oil. Further, in the hydraulic circuit of the continuously variable transmission, a foreign matter in oil or a small amount of oil leakage at a location other than the three solenoid valves can cause shortage of oil pressure supplied to the pulleys. However, in the above failure determination system, only the failure determination of the solenoids of the solenoid valves is carried out, so that it is impossible to discriminate failure of a hydraulic circuit component of the solenoid valves from failure of components of the hydraulic circuit other than the solenoid valves. As a result, even when only a hydraulic circuit component of the solenoid valves is faulty, the faulty component cannot be identified, but it is only possible to determine the failure of the hydraulic circuit as a whole. To locate a faulty portion of the hydraulic circuit, it is necessary to check the entire hydraulic circuit, which results in degraded maintainability of the continuously variable transmission. Particularly when locating of a faulty portion is impossible, it is necessary to replace the whole hydraulic circuit.

A determination system for a start clutch arrange in the drive system of a vehicle has been conventionally proposed e.g. in Japanese Laid-Open Patent Publication (Kokai) No. H02-176265 (pages 4-5 and FIG. 6). This failure determination system is for determining failure of a lockup clutch of a torque converter, and comprised of an engine speed sensor for detecting an engine speed, a TM rotational speed sensor for detecting a TM rotational speed input to a transmission, and a microcomputer to which all of these sensors are connected. Further, a solenoid valve is connected to the microcomputer, for controlling oil pressure supplied via a hydraulic circuit to the lockup clutch according to a command signal from the microcomputer, whereby the engaging force of the lockup clutch is controlled.

In the proposed failure determination system, when the command signal is input to the solenoid valve from the microcomputer, thereby controlling the lockup clutch to the engaged state, failure of a lockup system including the solenoid valve and the hydraulic circuit is determined based on results of comparison between the engine speed and the TM rotational speed, in other words, based on the results of comparison between the input-side rotational speed of the lockup clutch and the output-side rotational speed of the same. More specifically, when a slip ratio as a quotient of division of the difference between the engine speed and the TM rotational speed by the engine speed is more than a predetermined value B (3%), it is determined that the lockup system is faulty. Further, in this failure determination system, the command signal input to the solenoid of the solenoid valve is compared with a monitor signal monitoring the solenoid from a monitor circuit of a drive circuit, whereby occurrence of a disconnection or a short circuit in the solenoid is determined.

Further, a start clutch arrange between an automatic transmission of the drive system of a vehicle and drive wheels of the same has been conventionally proposed e.g. in Japanese Laid-Open Patent Publication (Kokai) No. 2002-

39352 (pages 4-5 and FIG. 1). In this start clutch, an electric control valve controls oil pressure supplied from an oil pressure pump to the start clutch whereby the engaging force of the start clutch is controlled. Further, the automatic transmission is implemented by a continuously variable transmission of a belt type having a belt stretched around two variable pulleys.

When the conventional failure determination system disclosed in Japanese Laid-Open Patent Publication (Kokai) No. H02-176265 is applied to the start clutch disclosed in Japanese Laid-Open Patent Publication (Kokai) No. 2002-39352, there arises the following problems: According to the conventional failure determination system disclosed in Japanese Laid-Open Patent Publication (Kokai) No. H02-176265, the determination of whether or not a disconnection or a short circuit has occurred in the solenoid of the solenoid valve is performed separately from the determination of failure of the lockup system, and hence it is possible to discriminate failure of the solenoid and failure of the lockup system from each other. However, according to this failure determination system, only the failure determination of the solenoids is carried out, so that it is impossible to discriminate failure of a hydraulic circuit component of the solenoid valves from failure of components of the hydraulic circuit other than the solenoid valves, for the same reason described hereinabove as to the conventional failure determination system for a continuously variable transmission. As a result, even when only a hydraulic circuit component of the solenoid valve is faulty, the faulty component cannot be identified, but it is only possible to determine the failure of the hydraulic circuit as a whole. To locate a faulty portion of the hydraulic circuit, it is necessary to check the entire hydraulic circuit, which results in degraded maintainability of the start clutch. Particularly when locating of a faulty portion is impossible, it is necessary to replace the whole hydraulic circuit.

SUMMARY OF THE INVENTION

It is a first object of the present invention to provide a failure determination system for a continuously variable transmission of a belt type, which is capable of determining failure of control valves for performing speed varying operation, and enhancing maintainability of the transmission.

It is a second object of the present invention to provide a failure determination system for a start clutch, which is capable of determining failure of a control valve for controlling the engaging force of the start clutch, and enhancing maintainability of the start clutch.

To attain the first object, in a first aspect of the present invention, there is provided a failure determination system for a continuously variable transmission including a drive pulley which has torque input from a drive source of a vehicle, and whose pulley width is reduced by supply of oil pressure, a driven pulley which is connected to the drive pulley via a belt, and whose pulley width is reduced by supply of oil pressure, and a drive-side control valve and a driven-side control valve that control the oil pressure supplied from a hydraulic system to the drive pulley and the driven pulley, respectively, so as to carry out speed varying operation, the failure determination system determining failure of any of the drive-side control valve and the driven-side control valve, the failure determination system comprising:

transmission ratio-detecting means for detecting a transmission ratio between the drive pulley and the driven pulley;

vehicle speed-detecting means for detecting a vehicle speed of the vehicle; and failure-determining means for determining failure of at least one of the drive-side control valve and the driven-side control valve, based on the transmission ratio detected at one of a time during stoppage of the vehicle and a time immediately before the stoppage of the vehicle, the transmission ratio detected after a restart of the vehicle after the stoppage, and the detected vehicle speed.

With the arrangement of the failure determination system according to the first aspect of the invention, determination of failure of at least one of the drive-side control valve and the driven-side control valve is carried out based on transmission ratios detected during stoppage of the vehicle and after a restart of the vehicle after the stoppage, and a detected vehicle speed, so that it is possible to accurately determine the failure of the drive-side control valve and the driven-side control valve, by discriminating the failure from a failure caused by shortage of oil pressure from the hydraulic system. For example, when the transmission ratio indicates a low-speed side value in spite of a high vehicle speed, it can be determined, irrespective of the shortage or sufficiency of oil pressure supplied from the hydraulic system, that oil pressure is not supplied to the drive pulley owing to the failure of the drive-side control valve, whereby the width of the drive pulley is controlled to a wide width for a low-speed transmission ratio, and/or that the oil pressure is excessively supplied to the driven pulley owing to the failure of the driven-side control valve, whereby the width of the driven pulley is controlled to a narrow width for the low-speed transmission ratio. Inversely, when the transmission ratio indicates a high-speed side value in spite of a low vehicle speed, it can be determined, irrespective of the shortage or sufficiency of oil pressure supplied from the hydraulic system, that oil pressure is excessively supplied to the drive pulley owing to the failure of the drive-side control valve, whereby the width of the drive pulley is controlled to a narrow width for the high-speed transmission ratio, and/or that oil pressure is not supplied to the driven pulley owing to the failure of the driven-side control valve, whereby the width of the driven pulley is controlled to a wide width for the high-speed transmission ratio. As described above, it can be determined that the failure of at least one of the drive-side control valve and the driven-side control valve.

Preferably, the transmission ratio at one of the time during stoppage of the vehicle and the time immediately before the stoppage of the vehicle is set to a value within a predetermined low-speed range, and when the transmission ratio detected at the one of the time during stoppage of the vehicle and the time immediately before the stoppage of the vehicle is within the predetermined low-speed range, and at the same time the vehicle speed is increased to a predetermined vehicle speed or higher after the restart of the vehicle after the stoppage, unless the transmission ratio is reduced to a value lower than the predetermined low-speed range, said failure-determining means determines that there has occurred at least one of a failure in which the drive-side control valve is fixed in a state where the drive-side control valve has stopped the supply of oil pressure to the drive pulley, and a failure in which the driven-side control valve is fixed in a state where the driven-side control valve continues the supply of oil pressure to the driven pulley.

With the arrangement of this preferred embodiment, the transmission ratio at one of the time during stoppage of the vehicle and the time immediately before the stoppage of the vehicle is set to a value within a predetermined low-speed range, and hence when the transmission ratio detected at one of the time during stoppage of the vehicle and the time immediately before the stoppage of the vehicle is within the predetermined low-speed range, it is presumed that the width of the drive pulley is controlled to the wide width for the low-speed transmission ratio, and at the same time the width of the driven pulley is controlled to the narrow width for the low-speed transmission ratio, and hence that the two control valves normally operate. However, when the vehicle speed is increased to a value equal to or higher than a predetermined vehicle speed after the restart of the vehicle after the stoppage, unless the transmission ratio is reduced to a value lower than the predetermined low-speed range, i.e. unless the transmission ratio is changed to a high-speed transmission ratio, it can be determined that there has occurred a failure in which the drive-side control valve is fixed in a state where the drive-side control valve has stopped the supply of oil pressure to the drive pulley, whereby the oil pressure is not supplied to the drive pulley to cause the width of the drive pulley to be controlled to the wide width for the low-speed transmission ratio, and/or that there has occurred a failure in which the driven-side control valve is fixed in a state where the driven-side control valve continues the supply of oil pressure to the driven pulley, whereby the oil pressure is excessively supplied to the driven pulley to cause the width of the driven pulley to be controlled to the narrow width for the low-speed transmission ratio. As described above, since it is possible to specifically determine the failure of at least one of the drive-side control valve and the driven-side control valve, the continuously variable transmission can be repaired more easily than the prior art simply by replacing at least one of the two control valves, thereby making it possible to enhance maintainability of the continuously variable transmission.

Preferably, the transmission ratio at one of the time during stoppage of the vehicle and the time immediately before the stoppage of the vehicle is set to a value within a predetermined low-speed range, and when the transmission ratio detected at one of the time during stoppage of the vehicle and the time immediately before the stoppage of the vehicle is within a predetermined high-speed range lower than the predetermined low-speed range, the failure-determining means determines that there has occurred at least one of a failure in which the drive-side control valve is fixed in a state where the drive-side control valve continues the supply of oil pressure to the drive pulley, and a failure in which the driven-side control valve is fixed in a state where the driven-side control valve has stopped the supply of oil pressure to the driven pulley.

With the arrangement of this preferred embodiment, the transmission ratio at one of the time during stoppage of the vehicle and the time immediately before the stoppage of the vehicle is set to a value within a predetermined low-speed range, and hence, when the transmission ratio detected at one of the time during stoppage of the vehicle and the time immediately before the stoppage of the vehicle is within a predetermined high-speed range lower than the predetermined low-speed range, it can be determined that there has occurred a failure in which the drive-side control valve is fixed in a state where the drive-side control valve continues the supply of oil pressure to the drive pulley, whereby the oil pressure is excessively supplied to the drive pulley to cause the width of the drive pulley to be controlled to the narrow width for the high-speed transmission ratio, and/or that there has occurred a failure in which the driven-side control valve is fixed in a state where the driven-side control valve has stopped the supply of oil pressure to the driven pulley, whereby the oil pressure is not supplied to the driven pulley to cause the width of the driven pulley to be controlled to the wide width for the high-speed transmission ratio. As described above, since it is possible to specifically determine the failure of at least one of the drive-side control valve and the driven-side control valve, the continuously variable transmission can be repaired more easily than the prior art simply by replacing at least one of the two control valves, thereby making it possible to enhance maintainability of the continuously variable transmission.

Preferably, the failure determination system further comprises start operation-detecting means for detecting start operation of the vehicle, and when the transmission ratio detected at one of the time during stoppage of the vehicle and the time immediately before the stoppage of the vehicle is within the predetermined high-speed range lower than the predetermined low-speed range, and at the same time the start operation of the vehicle is detected, if the transmission ratio is increased to a value equal to or higher than a predetermined low-speed transmission ratio higher than the predetermined high-speed range, and at the same time the vehicle speed is lower than a second predetermined vehicle speed, the failure-determining means determines that there has occurred the failure in which the driven-side control valve is fixed in the state where the driven-side control valve has stopped the supply of oil pressure to the driven pulley.

With the arrangement of this preferred embodiment, when the transmission ratio detected at one of the time during stoppage of the vehicle and the time immediately before the stoppage of the vehicle is within the predetermined high-speed range lower than the value within the predetermined low-speed range, it can be determined that at least one of the drive-side control valve and the driven-side control valve is faulty, as described above. Further, in the case of the start operation of the vehicle being detected, even if the drive pulley is driven to the narrow width for the high-speed transmission ratio owing to the failure of the drive-side control valve, so long as the driven-side control valve is normal, there cannot be caused a state where the transmission ratio is increased to a value equal to or higher than the predetermined low-speed transmission ratio higher than the predetermined high-speed range in spite of the vehicle speed being lower than the second predetermined vehicle speed. Therefore, when the above state occurs, it can be determined that a significant slippage is occurring between the driven pulley and the belt by the failure in which the driven-side control valve is fixed in the state where the driven-side control valve has stopped the supply of oil pressure to the driven pulley. This makes it possible to accurately identify the failure of the driven-side control valve. As described above, since it is possible to identify the failure of the driven-side control valve, it is possible to more easily repair the continuously variable transmission simply by replacing the driven-side control valve, thereby making it possible to further enhance maintainability of the continuously variable transmission.

To attain the first object, in a second aspect of the present invention, there is provided a failure determination system for a continuously variable transmission including a drive pulley which has torque input from a drive source of a vehicle, and whose pulley width is reduced by supply of oil pressure, a driven pulley which is connected to the drive pulley via a belt, and whose pulley width is reduced by supply of oil pressure, and a drive-side control valve and a driven-side control valve that control the oil pressure supplied from a hydraulic system to the drive pulley and the driven pulley, respectively, so as to carry out speed varying operation, the failure determination system determining failure of any of the drive-side control valve and the driven-side control valve, wherein a transmission ratio between the drive pulley and the driven pulley at one of a time during stoppage of the vehicle and a time immediately before the stoppage of the vehicle is set to a value within a predetermined low-speed range, the failure determination system comprising:

transmission ratio-detecting means for detecting the transmission ratio;

torque-detecting means for detecting torque input to the drive pulley; and failure-determining means for determining that there has occurred a failure in which the drive-side control valve is fixed in a state where the drive-side control valve continues the supply of oil pressure to the drive pulley, on condition that the transmission ratio at the one of the time during stoppage of the vehicle and the time immediately before the stoppage of the vehicle is within a predetermined high-speed range lower than the predetermined low-speed range, that the torque detected by the torque-detecting means after a restart of the vehicle after the stoppage is larger than a predetermined torque, and that the transmission ratio is not increased to a predetermined low-speed transmission ratio higher than the predetermined high-speed range, after the restart of the vehicle after the stoppage thereof.

With the arrangement of the failure determination system according to the second aspect of the invention, when the transmission ratio at one of the time during stoppage of the vehicle and the time immediately before the stoppage of the vehicle is within a predetermined high-speed range lower than the predetermined low-speed side, it can be determined that at least one of the drive-side control valve and the driven-side control valve is a faulty state as described above. Further, after the vehicle is restarted after the stoppage, when torque detected by the torque-detecting means is larger than a predetermined torque, and at the same time the transmission ratio is not increased to a predetermined low-speed transmission ratio higher than the predetermined high-speed range, it can be determined that no significant slippage is occurring between the drive pulley and the belt, or between the driven pulley and the belt, in spite of large torque input to the drive pulley. Even when the driven pulley is actuated to the wide width for the high-speed transmission ratio owing to the failure of the driven-side control valve, the above state cannot be caused so long as the driven-side control valve is normal, since the transmission ratio is changed to a low-speed value. Therefore, when the above state occurs, it can be determined that there has occurred the failure in which the drive-side control valve is fixed in the state where the drive-side control valve continues the supply of oil pressure to the drive pulley, whereby the drive pulley is controlled to the narrow width for the high-speed transmission ratio. This makes it possible to accurately identify the failure of the drive-side control valve. As described above, since it is possible to identify the failure of the drive-side control valve, it is possible to easily repair the continuously variable transmission simply by replacing the drive-side control valve, thereby making it possible to enhance maintainability of the continuously variable transmission. (It should be noted that throughout the specification, the term "detection of torque" includes not only direct detection of torque by a sensor but also calculation of the torque).

To attain the second object, in a third aspect of the present invention, there is provided a failure determination system for a hydraulically-controlled start clutch that is disposed between a transmission to which torque is input from a power source of a vehicle and drive wheels of the vehicle, for being engaged by supply of oil pressure thereto from a hydraulic system via a control valve, such that an engaging force of the start clutch is controlled according to an input command to the control valve, the failure determination system determining failure of the control valve, the failure determination system comprising:

vehicle start operation-detecting means for detecting a start operation of the vehicle;

vehicle speed-detecting means for detecting a vehicle speed of the vehicle;

rotational speed parameter-detecting means for detecting a rotational speed parameter indicative of a rotational speed of the power source; and failure-determining means for determining failure of the control valve based on a result of detection by the vehicle start operation-detecting means, the input command to the control valve, the detected vehicle speed, and the detected rotational speed parameter.

With the arrangement of the failure determination system according to the third aspect of the invention, the engaging force of the start clutch is controlled according to the input command to the control valve. This allows determination of failure of the control valve based on a result of detection by the vehicle start operation-detecting means, the input command to the control valve, the detected vehicle speed, and the detected rotational speed parameter. For example, in a state where the vehicle starting operation is detected, even if the supply of oil pressure from the hydraulic system is short, in spite of supply of oil pressure which is high enough to generate the sufficiently strong engaging force of the start clutch, if the vehicle speed does not rise, it can be determined that owing to the failure of the control valve, the oil pressure is not supplied to the start clutch, so that the engaging force is so small that the power from the transmission is not transferred to the drive wheels, or that the vehicle is climbing a hill. In such a state, if the rotational speed parameter indicates a rise in the rotational speed of the power source, it can be determined that the vehicle is not climbing a hill, but the control valve is faulty. Thus, the failure of the control valve can be identified, which makes it possible to repair the start clutch simply by replacing the faulty control valve, and thereby improve maintainability of the start clutch.

Preferably, the failure-determining means determines that the control valve is faulty, on condition that the vehicle starting operation has been detected, that a value of the input command to the control valve is within a predetermined range, that the detected vehicle speed is lower than a predetermined vehicle speed, and that the rotational speed parameter indicates that the rotational speed of the power source is equal to or higher than a predetermined value.

With the arrangement of the preferred embodiment, as described above, the engaging force of the start clutch is controlled according to the input command to the control valve, by setting the predetermined range to such a range that even if the supply of oil pressure from the hydraulic system is short, it is expected that due to the input command, the start clutch is supplied with an oil pressure high enough to generate an engaging force of the start clutch strong enough to cause the vehicle to start, if the vehicle starting operation is detected, and at the same time, the command input to the control valve is within the predetermined range, it can be presumed that the start clutch should be sufficiently engaged, and the vehicle should make a standing start and shift to a traveling condition. In spite of such conditions, if the vehicle speed is lower than the predetermined vehicle speed, it can be determined that the oil pressure is not supplied to the start clutch owing to the failure of the control valve irrespective of shortage of supply of oil pressure from the hydraulic system, so that the engaging force of the start clutch is not strong enough to transfer the power from the transmission to the drive wheels, or that the vehicle is climbing a hill. In such a case, if the rotational speed parameter indicates that the rotational speed of the power source is equal to or higher than a predetermined value, it can be determined that the vehicle is not climbing a hill, but that owing to the failure of the solenoid valve, the power is not transferred from the transmission to the drive wheels. In short, the failure of the control valve can be accurately identified.

To attain the second object, in a fourth aspect of the present invention, there is provided a failure determination system for a hydraulically-controlled start clutch that is installed on a vehicle, the start clutch being disposed between a continuously variable transmission of a belt type including a drive pulley which has torque input from a drive source of the vehicle, a driven pulley, and a belt stretched around the drive pulley and the driven pulley, and drive wheels of the vehicle, for being engaged by supply of oil pressure thereto from a hydraulic system via a control valve, such that an engaging force of the start clutch is controlled according to an input command to the control valve, the failure determination system determining failure of the control valve, the failure determination system comprising:

vehicle start operation-detecting means for detecting a start operation of the vehicle;

vehicle speed-detecting means for detecting a vehicle speed of the vehicle;

rotational speed parameter-detecting means for detecting a rotational speed parameter indicative of a rotational speed of the power source; and failure-determining means for determining failure of the control valve based on a result of detection by the vehicle start operation-detecting means, the input command to the control valve, the detected vehicle speed, and the detected rotational speed parameter.

With the arrangement of the failure determination system according to the fourth aspect of the invention, the determination of failure of the control valve is carried out based on a result of detection by the vehicle start operation-detecting means, the input command to the control valve, the detected vehicle speed, and the detected rotational speed parameter. Therefore, as described above, while discriminating from the case of the vehicle climbing a hill, it can be determined that the failure of the control valve, irrespective of shortage of the oil pressure supplied from the hydraulic system. Thus, differently from the prior art, it is possible to identify the failure of the control valve, which makes it possible to repair the start clutch simply by replacing the control valve, thereby improve maintainability of the same.

Preferably, the failure-determining means determines that the control valve is faulty, on condition that the vehicle starting operation has been detected, that a value of the input command to the control valve is within a predetermined range, that the detected vehicle speed is lower than a predetermined vehicle speed, and that the rotational speed parameter indicates that the rotational speed of the power source is equal to or higher than a predetermined value.

With the arrangement of the preferred embodiment, as described above, the engaging force of the start clutch is controlled according to the input command to the control valve, by setting the predetermined range to such a range that even if the supply of oil pressure from the hydraulic system is short, it is expected that due to the input command, the start clutch is supplied with an oil pressure high enough to generate an engaging force of the start clutch strong enough to cause the vehicle to start, if the vehicle starting operation is detected, and at the same time the command input to the control valve is within the predetermined range, it can be presumed that the start clutch should be sufficiently engaged, and the vehicle should make a standing start and shift to a traveling condition. In spite of such conditions, if the vehicle speed is lower than the predetermined vehicle speed, it can be determined that the oil pressure is not supplied to the start clutch owing to the failure of the control valve irrespective of shortage of supply of oil pressure from the hydraulic system, so that the engaging force of the start clutch is not strong enough to transfer the power from the transmission to the drive wheels, or that the vehicle is climbing a hill. In such a case, if the rotational speed parameter indicates that the rotational speed of the power source is equal to or higher than a predetermined value, it can be determined that the vehicle is not climbing a hill, but that owing to the failure of the solenoid valve, the power is not transferred from the transmission to the drive wheels. In short, the failure of the control valve can be accurately identified.

The above and other objects, features, and advantages of the present invention will become more apparent from the following detailed description taken in conjunction with the accompanying drawings.

BRIEF DESCRIPTION OF THE DRAWINGS

FIG. 2 is a block diagram schematically showing the arrangement of the failure determination system and a hydraulic circuit of the drive system;

FIG. 19 is a timing chart showing an example of operations executed in a case where at least one of fixation of the DR solenoid valve in the fully-closed state and fixation of the DN solenoid valve in the fully-open state has occurred when a transmission ratio RATIO during stoppage of the vehicle is within a stop-time LOW-side range;

DETAILED DESCRIPTION OF THE PREFERRED EMBODIMENTS

Figure 1:
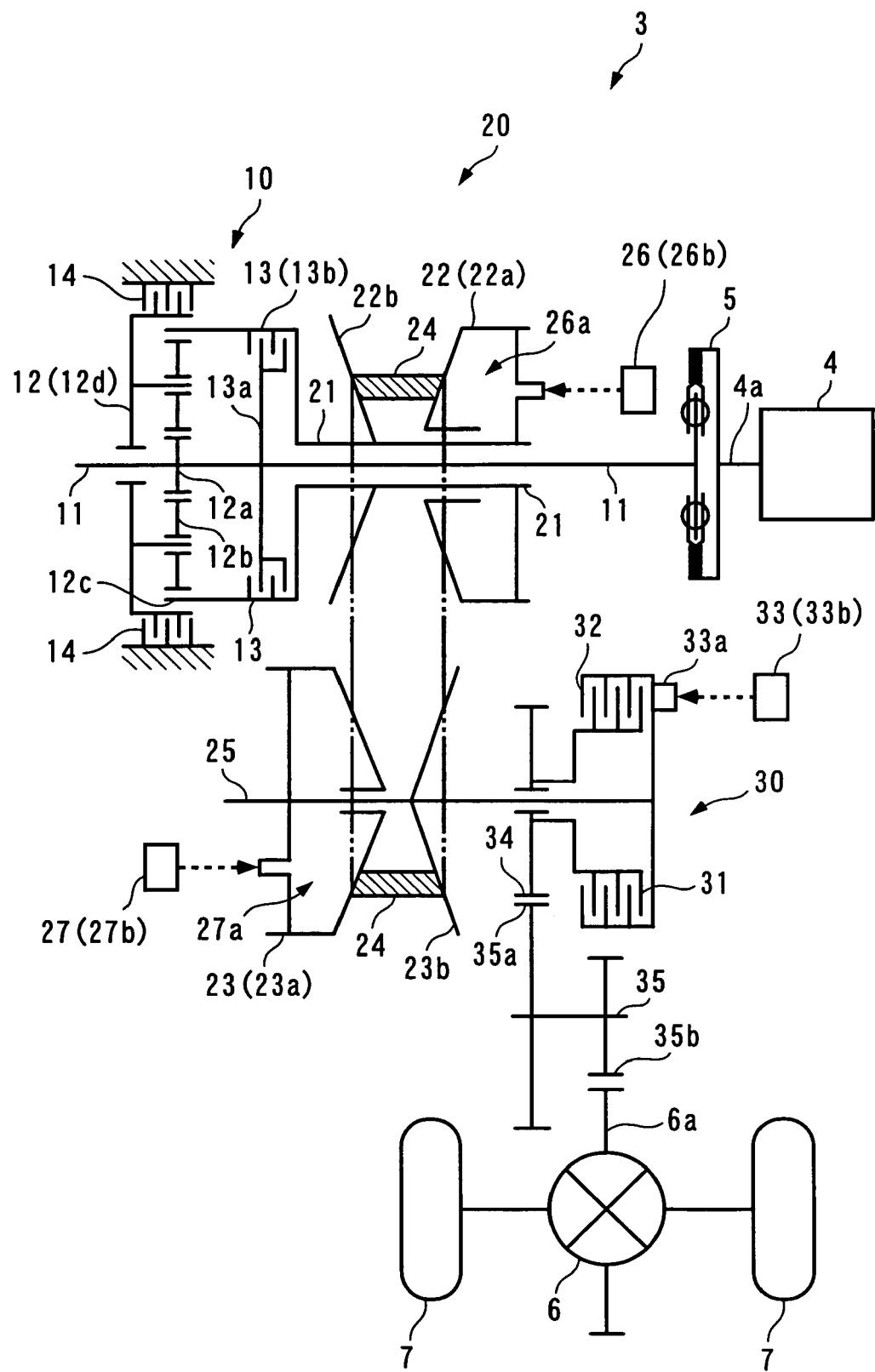
FIG. 1 is a skeleton diagram schematically showing the arrangement of a drive system of a vehicle including a continuously variable transmission and a start clutch to which a failure determination system according to an embodiment of the present invention is applied.

The invention will now be described in detail with reference to drawings showing a preferred embodiment thereof. Referring first to FIG. 1, there is schematically shown the arrangement of a drive system of an automotive vehicle 3 including a continuously variable transmission 20 and a start clutch 30 to which a failure determination system 1 according to the present embodiment is applied. FIG. 2 schematically shows the arrangement of the failure determination system 1 and a hydraulic circuit 28 of the drive system. The failure determination system 1 is comprised of an ECU 2, referred to hereinafter, and various sensors 40 to 47, referred to hereinafter, and the ECU 2 carry out various types of failure determination on solenoid valves, as described in detail hereinafter.

As shown in FIG. 1, in the drive system of the vehicle 3, an engine 4 as a drive source is connected to drive wheels 7 and 7 via a forward/backward travel-switching mechanism 10, a continuously variable transmission of a belt type 20, the start clutch 30, and a differential gear mechanism 6, whereby the torque of the engine 4 is transferred to the drive wheels 7 and 7.

The forward/backward travel-switching mechanism 10 includes an input shaft 11, and a planetary gear mechanism 12 mounted on the input shaft 11. The input shaft 11 has one end connected to a crankshaft 4a of the engine 4 via a flywheel 5, and rotatably extends through a hollow main shaft 21. The planetary gear mechanism 12 is comprised of a sun gear 12a, a carrier 12d for rotatably supporting a plurality of (e.g. four) pinion gears 12b mating with the sun gear 12a, and a ring gear 12c mating with the pinion gears 12b.

The sun gear 12a is integrally formed with the input shaft 11, and the input shaft 11 has a portion thereof on the engine side with respect to the sun gear 12a, connected to an inner plate 13a of a forward clutch 13. Further, an outer plate 13b of the forward clutch 13 is connected to the ring gear 12c and the main shaft 21. The engagement and disengagement of the forward clutch 13 is controlled by the ECU 2. The carrier 12d has a reverse brake 14 connected thereto. The operation of the reverse brake 14 is also controlled by the ECU 2.

Due to the construction described above, in the forward/backward travel-switching mechanism 10, when the vehicle 3 is moved forward, the reverse brake 14 is released, and the forward clutch 13 is engaged, whereby the input shaft 11 and the main shaft 21 are directly connected to each other to directly transmit the rotation of the input shaft 11 to the main shaft 21, while the pinion gears 12b do not rotate about their axes, and the carrier 12d idly rotate in unison with the input shaft 11 in the same direction. Thus, during the forward movement of the vehicle 3, the main shaft 21 rotate in the same direction as the input shaft 11 at the same rotational speed.

On the other hand, when the vehicle 3 is moved backward, inversely to the above, the forward clutch 13 is disengaged but the reverse brake 14 is locked to thereby lock the carrier 12d to inhibit rotation thereof. This causes the rotation of the input shaft 11 to be transmitted to the ring gear 12c via the sun gear 12a and the pinion gears 12b, whereby the ring gear 12c and the main shaft 21 connected thereto rotate in a direction opposite to the direction of rotation of the input shaft 11. Thus, during the backward movement of the vehicle 3, the main shaft 21 rotates in the direction opposite to the direction of rotation of the input shaft 11.

The continuously variable transmission 20 is a so-called belt-type CVT, and comprised of the main shaft 21, a drive pulley 22, a driven pulley 23, a counter shaft 25, a drive pulley width variable mechanism 26, and a driven pulley width variable mechanism 27.

The drive pulley 22 has a moving part 22a having a truncated conical shape, and a fixed part 22b. The moving part 22a is mounted to the main shaft 21 such that it is axially movable but unrotatable thereabout, while the fixed part 22b is disposed in a manner opposed to the moving part 22a, and fixed to the main shaft 21. Further, opposed surfaces of the moving part 22a and the fixed part 22b are formed to provide inclined surfaces, whereby a V-shaped belt groove for causing the belt 24 to extent therein is formed between the moving part 22a and the fixed part 22b.

The drive pulley width variable mechanism 26 is for changing the pulley width of the drive pulley 22, and includes a DR oil chamber 26a formed within the moving part 22a, a DR solenoid valve 26b for controlling the oil pressure supplied to the DR oil chamber 26a, and a return spring (not shown) for urging the moving part 22a toward the fixed part 22b.

As shown in FIG. 2, the DR solenoid valve 26b is disposed between an oil pressure pump 28a of the hydraulic circuit 28 (hydraulic system) and the DR oil chamber 26a in the moving part 22a, and connected to them via respective oil passages 28b and 28b. The oil pressure pump 28a (hydraulic system) is connected, though not shown, to the crankshaft 4a of the engine 4, for being driven by the crankshaft 4a during the operation of the engine 4, to thereby deliver the oil pressure. This causes the oil pressure delivered from the oil pressure pump 28a to be constantly supplied to the DR solenoid valve 26b via the oil passage 28b.

The DR solenoid valve 26b is of a normally-open type comprised of a combination of a solenoid and a spool valve (neither of which is shown), and electrically connected to the ECU 2. When no input command DRCMD (electric signal) is supplied from the ECU 2, the DR solenoid valve 26b is held in the fully-open state, that is, at the maximum valve opening, to thereby supply oil pressure from the oil pressure pump 28a to the DR oil chamber 26a via the oil passages 28b. Further, the DR solenoid valve 26b is configured as a linear solenoid valve whole valve opening is linearly decreased as the value of the input command DRCMD from the ECU 2 is increased.

Figure 3A:
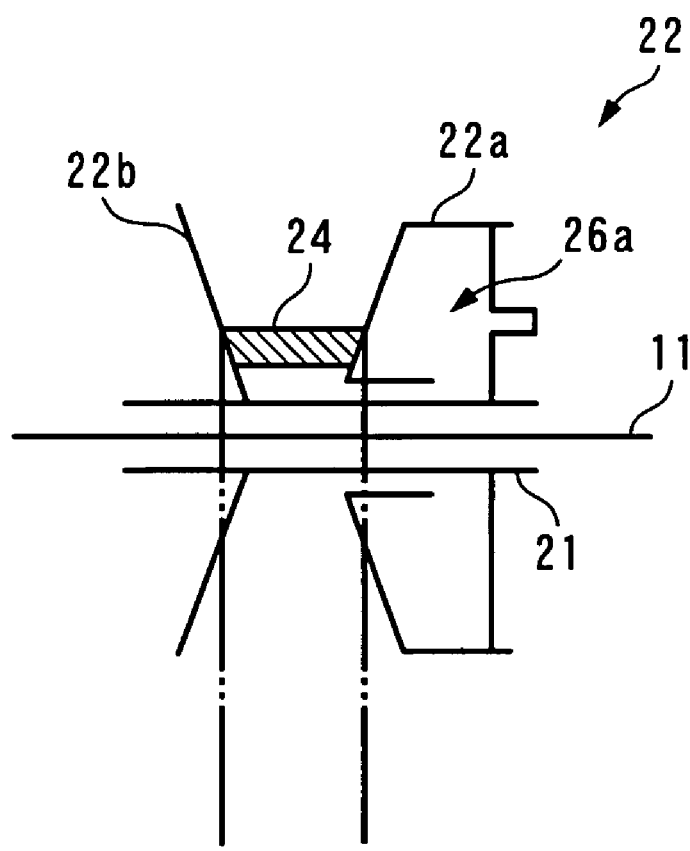
FIG. 3A is a diagram schematically showing a state where the pulley width of a drive pulley is controlled to a wide width for a low-speed transmission ratio.
Figure 3B:
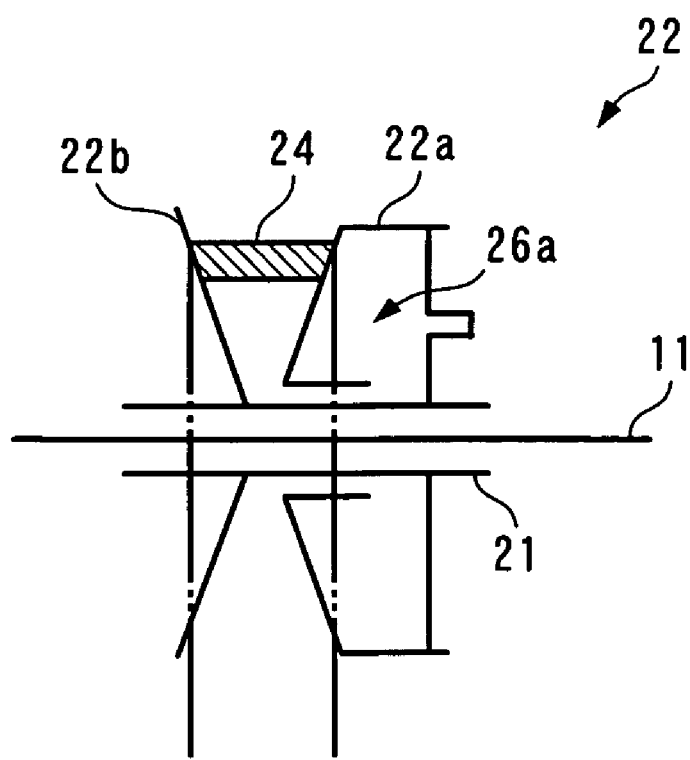
FIG. 3B is a diagram schematically showing a state where the pulley width of the drive pulley is controlled to a narrow width for a high-speed transmission ratio.

Due to the above construction, in the drive pulley width variable mechanism 26, during operation of the engine 4, the DR solenoid valve 26b is controlled by the input command DRCMD from the ECU 2, whereby the moving part 22a is axially actuated. As a result, the pulley width of the drive pulley 22 is continuously changed between a wide width for a low-speed transmission ratio shown in FIG. 3A and a narrow width for a high-speed transmission ratio shown in FIG. 3B. Further, when oil pressure from the DR solenoid valve 26b to the DR oil chamber 26a is interrupted, the drive pulley 22 is held to a pulley width at which the urging force of the return spring and the tensile force of the belt 24 are balanced with each other.

Further, the driven pulley 23 is constructed similarly to the drive pulley 22. That is, the driven pulley 23 has a moving part 23a having a truncated conical shape, and a fixed part 23b. The moving part 23a is mounted on the counter shaft 25 such that it is axially movable but unrotatable thereabout, while the fixed part 23b is disposed in a manner opposed to the moving part 23a, and fixed to the counter shaft 25. Further, opposed surfaces of the moving part 23a and the fixed part 23b are formed to provide inclined surfaces, whereby a V-shaped belt groove for causing the belt 24 to extent therein is formed between the moving part 23a and the fixed part 23b. The transmission belt 24 is a metal belt, and stretched around the pulleys 22 and 23 in a state fitted in the belt grooves thereof.

The driven pulley width variable mechanism 27 is for changing the pulley width of the driven pulley, and constructed similarly to the drive pulley width variable mechanism 26. That is, the driven pulley width variable mechanism 27 includes a DN oil chamber 27a formed within the moving part 23a, a DN solenoid valve 27b for controlling the oil pressure supplied to the DN oil chamber 27a, and a return spring (not shown) for urging the moving part 23a toward the fixed part 23b.

The DN solenoid valve 27b is disposed between the oil pressure pump 28a and the DN oil chamber 27a of the moving part 23a, and connected to them via respective oil passages 28b and 28b. This causes, during operation of the engine 4, the oil pressure delivered from the oil pressure pump 28a to be constantly supplied to the DN solenoid valve 27b via the oil passage 28b. The DN solenoid valve 27b is of a normally-open type, similarly to the DR solenoid valve 26b, which is comprised of a combination of a solenoid and a spool valve (neither of which is shown). When the input command PNCMD from the ECU 2 is not supplied to the DN solenoid valve 27b, the DN solenoid valve 27b is held in the fully-open state to thereby supply oil pressure from the oil pressure pump 28a to the DN oil chamber 27a via the oil passages 28b.

Figure 4A:
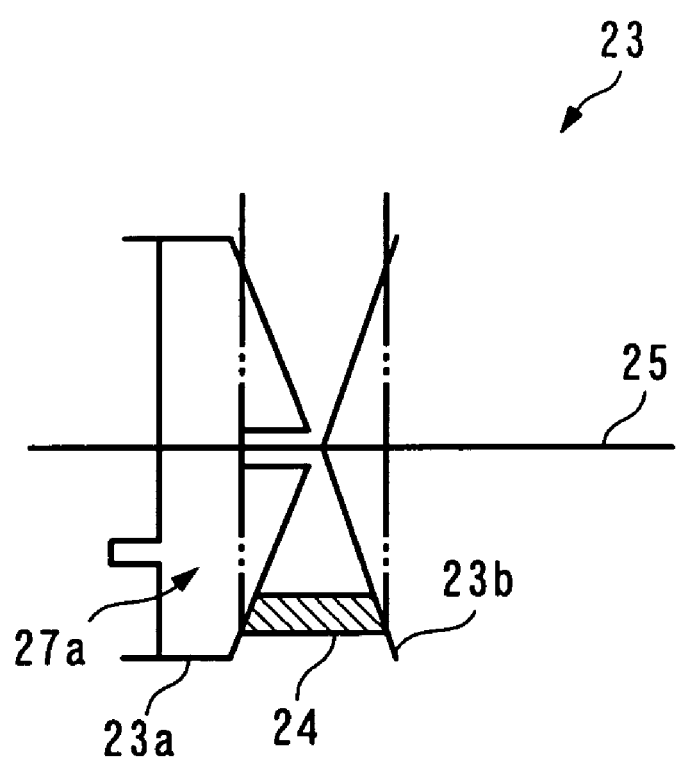
FIG. 4A is a diagram schematically showing a state where the pulley width of a driven pulley is controlled to a narrow width for the low-speed transmission ratio.
Figure 4B:
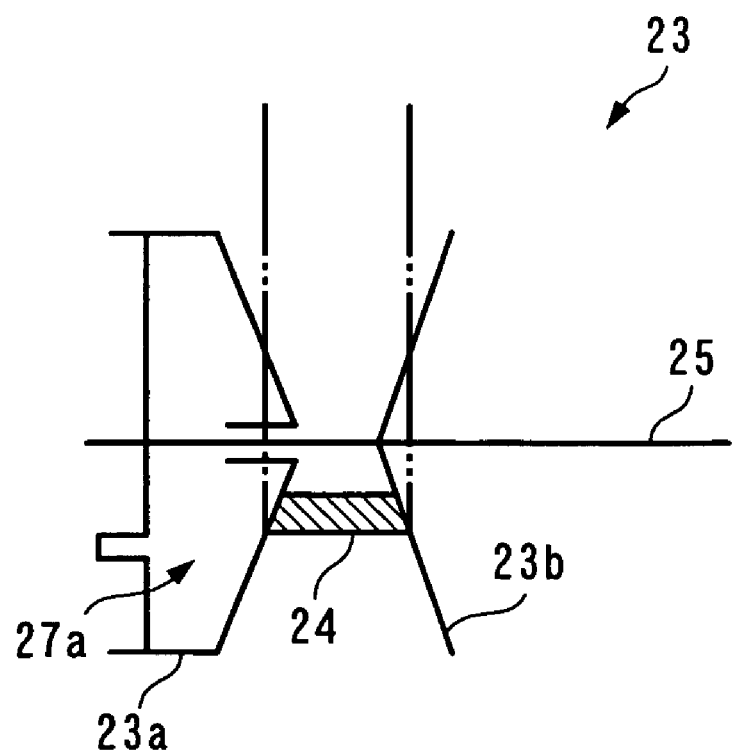
FIG. 4B is a diagram schematically showing a state where the pulley width of the driven pulley is controlled to a wide width for the high-speed transmission ratio.

Due to the above construction, in the driven pulley width variable mechanism 27, during operation of the engine 4, the DN solenoid valve 27b is controlled by the command input DNCMD from the ECU 2, whereby the moving part 23a is axially actuated. As a result, the pulley width of the driven pulley 23 is continuously changed between a narrow width for a low-speed transmission ratio shown in FIG. 4A and a wide width for a high-speed transmission ratio shown in FIG. 4B. Further, when the supply of the oil pressure from the DN solenoid valve 27b to the DN oil chamber 27a is interrupted, the driven pulley 23 is held at a pulley width at which the urging force of the return spring and the tensile force of the belt 24 are balanced with each other.

As described above, in the continuously variable transmission 20, the two solenoid valves 26b and 27b are controlled by the ECU 2 to continuously vary the pulley widths of the two pulleys 22 and 23, whereby the transmission ratio RATIO (=NDR/NDN) defined as a ratio of a drive-pulley rotational speed NDR of the drive pulley 22 and a driven-pulley rotational speed NDN of the driven pulley 23 is continuously variably controlled.

The start clutch 30 is a friction multi-plate clutch of a hydraulically controlled type which has its engagement and disengagement controlled by the supply of oil pressure thereto, and is comprised of a multiplicity of inner plates 31 and a multiplicity of outer plates 32, a clutch engagement mechanism 33 for engaging and disengaging between these plates 31 and 32, and a return spring, not shown, for urging these plates 31 and 32 in the direction of disengagement therebetween. These inner plates 31 are connected to a gear 34 rotatably fitted on the counter shaft 25, and rotate in unison with the gear 34 along with rotation thereof. Further, the outer plates 32 are connected to the counter shaft 25, and rotate in unison therewith along with rotation thereof.

The clutch engagement mechanism 33 is comprised of a clutch oil chamber 33a and an SC solenoid valve 33b (control valve). As shown in FIG. 2, the SC solenoid valve 33b is disposed between the oil pressure pump 28a of the hydraulic circuit 28 and the clutch chamber 33a, and connected to them via the oil passages 28b and 28b.

The SC solenoid valve 33b is of a normally-closed type which is comprised of a combination of a solenoid and a spool valve (neither of which is shown), and electrically connected to the ECU 2. When the SC solenoid valve 33b has no input command SCCMD from the ECU 2, the SC solenoid valve 33b is held in the fully-closed state, which inhibits oil pressure from the oil pressure pump 28a from being supplied to the clutch oil chamber 33a, whereby the inner plates 31 and the outer plates 32 are disengaged from each other by the pressure (urging force) of the return spring. As a result, no friction is generated between the plates 31 and 32 to thereby hinder the rotation and torque of the counter shaft 25 from being transmitted to the gear 34. In short, the start clutch 30 is held in the disengaged state. Further, the SC solenoid valve 33b is constructed as a linear solenoid valve whose valve opening is linearly increased as the value of the input command SCCMD from the ECU 2 is increased.

Further, the gear 34 mates with a large idler gear 35a integrally formed with an idler shaft 35, and a small idler gear 35b integrally formed with the idler shaft 35 mates with a gear 6a of the differential gear mechanism 6. This causes the gear 6a to rotate along with rotation of the gear 34.

Due to the above construction, during operation of the engine 4, when the input command SCCMD from the ECU 2 to the SC solenoid valve 33b, oil pressure is supplied to the clutch oil chamber 33a, and the inner plates 31 and the outer plates 32 are engaged with each other against the pressure of the return spring. As a result, a frictional force is generated between the plates 31, 32 to engage the start clutch 30, whereby the rotation and torque of the counter shaft 25 is transferred to the drive wheels 7 and 7. In this process, as the value of the input command SCCMD to the SC solenoid valve 33b is increased, the valve opening of the SC solenoid valve 33b is increased to increase the oil pressure supplied to the clutch oil chamber 33a, whereby the engagement force of the start clutch 30 is controlled to a larger value.

Also connected to the ECU 2 are a crankshaft sensor 40 (rotational speed parameter-detecting means), a throttle valve opening sensor 41 (vehicle start operation-detecting means), an intake pipe absolute pressure sensor 42, an accelerator pedal opening sensor 43, a drive-pulley rotational speed sensor 44 (transmission ratio-detecting means, and rotational speed parameter-detecting means), a driven-pulley rotational speed sensor 45 (transmission ratio-detecting means, and rotational speed parameter-detecting means), an idler shaft rotational speed sensor 46 (vehicle speed-detecting means), and a shift position sensor 47.

The crank angle sensor 40 is formed by a combination of a magnet rotor and an MRE pickup (neither of which is shown), and delivers a CRK signal, which is a pulse signal, to the ECU 2 along with rotation of the crankshaft 4a. Each pulse of the CRK signal is generated whenever the crankshaft 4a rotates through a predetermined crank angle (e.g. 30 degrees), and the ECU 2 calculates the rotational speed NE (rotational speed parameter) of the engine 4 (hereafter referred to as "the engine speed") based on the CRK signal.

The throttle valve opening sensor 41 detects the throttle valve opening TH (result of detection by the vehicle start operation-detecting means); the intake pipe absolute pressure sensor 42 detects an intake pipe absolute pressure PBA which is the absolute pressure within the intake pipe (not shown) of the engine 4; and the accelerator pedal opening sensor 43 detects the accelerator pedal opening AP, which is a degree of opening i.e. stepped-on amount of an accelerator pedal, not shown, of the vehicle 3. Respective signals indicative of detected parameters of operating conditions of the engine 4 are delivered to the ECU 2.

Further, the drive-pulley rotational speed sensor 44 detects the drive-pulley rotational speed NDR (rotational speed parameter), which is the rotational speed of the drive pulley 22; the driven-pulley rotational speed sensor 45 detects the driven-pulley rotational speed NDN (rotational speed parameter), which is the rotational speed of the driven pulley 23; and the idler shaft rotational speed sensor 46 detects an idler shaft rotational speed NDI, which is the rotational speed of the idler shaft 35. Respective signals indicative of the rotational speeds detected by these sensors are delivered to the ECU 2. The ECU 2 calculates the transmission ratio RATIO (rotational speed parameter) based on the drive-pulley rotational speed NDR and the driven-pulley rotational speed NDN. Further, the ECU 2 calculates a slip ratio ESC (%) which is a ratio between the input-side rotational speed and output-side rotational speed of the start clutch 30 based on the drive-pulley rotational speed NDN and the idler shaft rotational speed NDI, and also calculates the vehicle speed VP based on the idler shaft rotational speed NDI.

The shift position sensor 47 detects a position of a shift lever, not shown, in one of six shift ranges: D-range, R-range, N-range, D-range, S(sports)-range, and L-range, and delivers a signal POSI indicative of the detected position of the shift lever to the ECU 2. The S-range is for the forward travel, and when the shift lever is in the S-range, the transmission ratio RATIO is controlled to a value slightly higher than when the same is in the D-range.

The ECU 2 is implemented by a microcomputer comprised of a CPU, a RAM, a ROM, and an input/output interface, none of which are shown. The ECU 2 determines whether or not a failure of any of the solenoid valves 26b, 27b, and 33b has occurred, as described hereinafter, based on the signals inputted from the above sensors 40 to 47. In the present embodiment, the transmission ratio-detecting means, the vehicle speed-detecting means, failure-determining means, the vehicle start operation-detecting means, torque-detecting means, and the rotational speed parameter-detecting means are implemented by the ECU 2.

Although not shown, the ECU 2 controls the operating condition of the engine 4, the connected state of the forward/backward travel-switching mechanism 10, the speed varying operation of the continuously variable transmission 20, the engaged state of the start clutch 30, the throttle valve opening TH, and so forth. For example, during stoppage of the vehicle 3, the transmission ratio RATIO is controlled to a value within a predetermined LOW (low-speed)-side range (range of RTDRDNBL≦RATIO≦RTDRDNBH, referred to hereinafter, e.g. a range of 2.0 through 2.5). Further, during travel of the vehicle 3, a target transmission ratio RATTGT is calculated based on the vehicle speed VP and the throttle valve opening TH, and the speed varying operation of the continuously variable transmission 20 is controlled such that the transmission ratio RATIO becomes equal to the target transmission ratio RATTGT. As a result, when the vehicle 3 is traveling, the transmission ratio RATIO is controlled to a value within a predetermined range (e.g. 0.4 to 2.5).

Further, the ECU 2 controls the engagement force of the start clutch 30 based on the operating conditions of the engine 4, the state of the speed varying operation of the continuously variable transmission 20, and so forth. Further, when the vehicle 3 is standing with the engine 4 operating, the forward/backward travel-switching mechanism 10 is controlled such that the torque of the engine 4 is transferred to the continuously variable transmission 20, and the start clutch 30 is controlled to be disengaged. As a result, even when the vehicle 3 is standing, the drive pulley 22 and the driven pulley 23 rotate, so that the transmission ratio RATIO is calculated.

It should be noted that the RAM of the ECU 2 is comprised of an ordinary RAM which has data stored therein erased when the supply of electric power is interrupted after the stop of the engine 4, and a backup RAM which holds data stored therein even after the stop of the engine 4, due to power supply from a backup power source.

Next, a solenoid valve monitoring process carried out by the ECU 2 will be described with reference to FIG. 5. The solenoid valve monitoring process is performed to determine whether or not any of the DR solenoid valve 26b, the DN solenoid valve 27b, and the SC solenoid valve 33b has failed, i.e. is faulty, and executed whenever a predetermined time period (e.g. 100 msec.) elapses.

Figure 5:
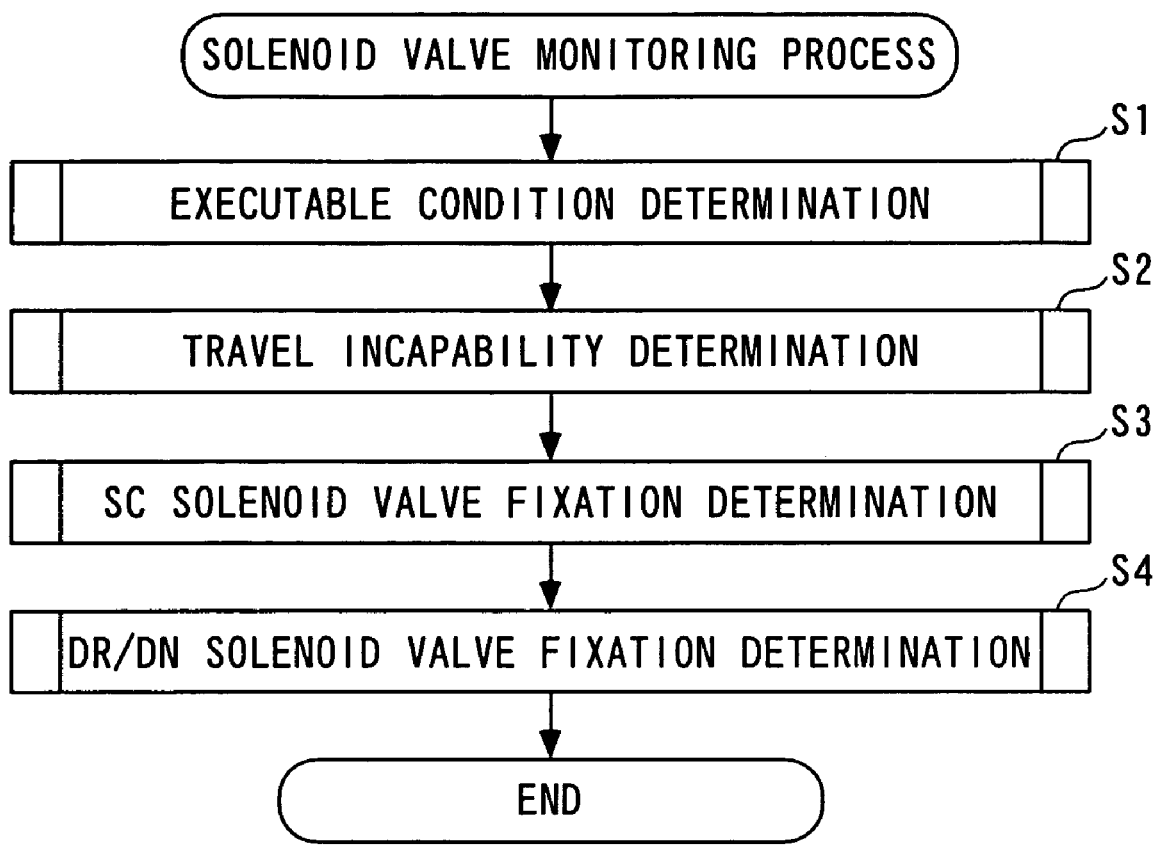
FIG. 5 is a flowchart showing a main routine for carrying out a solenoid valve monitoring process.

As shown in FIG. 5, in this process, first, in a step 1 (in FIG. 5, abbreviated to S1; this rule also applies to the other steps referred to hereinafter), an executable condition determining process is carried out. This process is performed to determine whether or not conditions for executing the solenoid valve failure determination are satisfied, which will be described in detail hereinafter.

Then, in a step 2, a travel incapability determining process is carried out. This process is for determining whether or not the vehicle 3 is incapable of traveling, and details thereof will be described hereinafter.

Next, in a step 3, a fixation determining process for determining fixation of the SC solenoid valve 33b is carried out. This process is for determining whether or not the SC solenoid valve 33b is fixed in the fully-closed state, and details thereof will be described hereinafter.

Then, in a step 4, a fixation determining process for determining whether any of the DR solenoid valve 26b and the DN solenoid valve 27b is fixed is carried out. This process is for determining whether or not any of the solenoid valves 26b and 27b is fixed in the fully-open state or in the fully-closed state, and details thereof will be described hereinafter. After that, the solenoid valve monitoring process is terminated.

Figure 6:
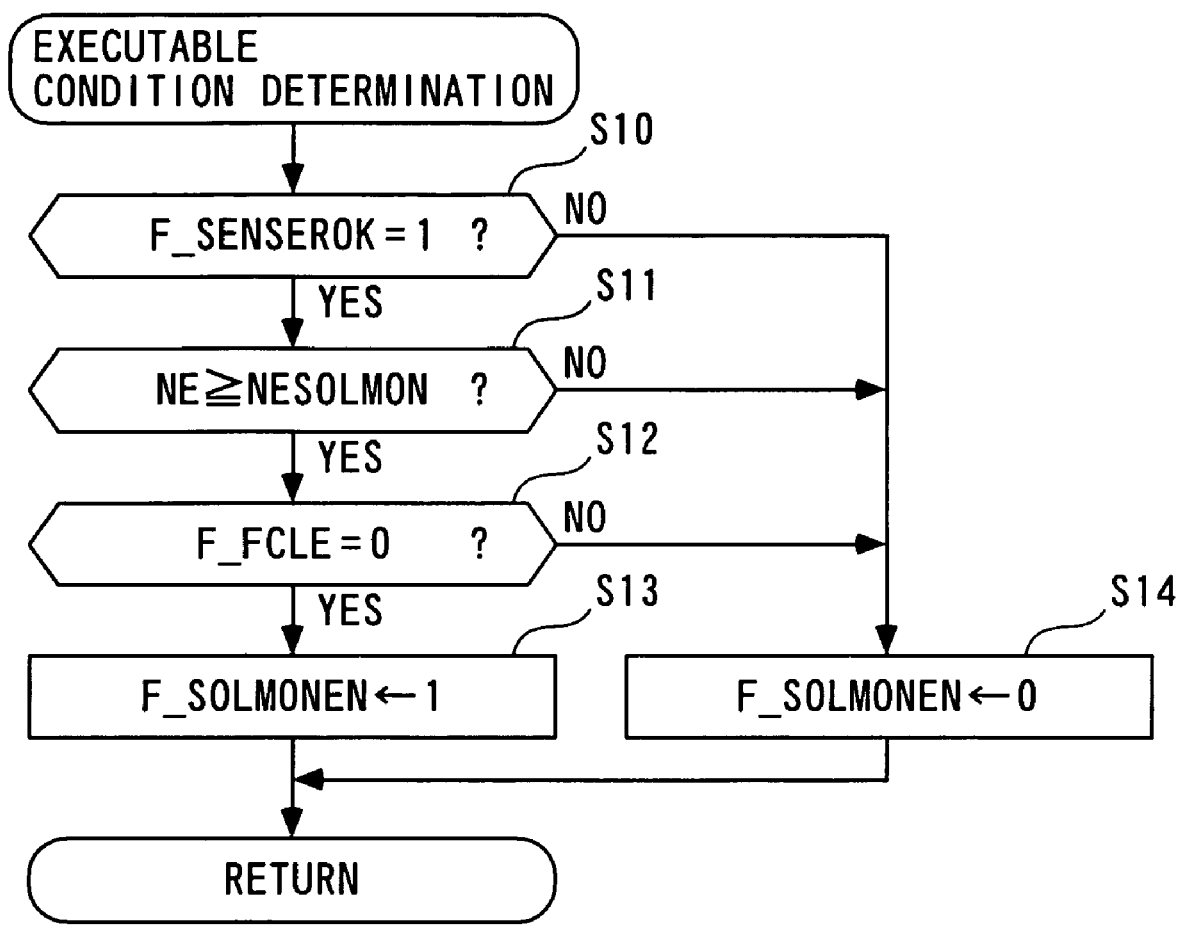
FIG. 6 is a flowchart showing a subroutine carried out for an executable condition determining process.

Next, the executable condition determining process carried out in the step 1 will be described with reference to FIG. 6. In this process, first, in a step 10, it is determined whether or not a sensor normality flag F_SENSEROK is equal to 1. The sensor normality flag F_SENSEROK is set to 1 when it is determined that all of the above-mentioned sensors 40 to 47 are normal, and otherwise set to 0.

If the answer to the above question is affirmative (YES), i.e. if all of the above-mentioned sensors 40 to 47 are normal, the process proceeds to a step 11, wherein it is determined whether or not the engine rotational speed NE is equal to or higher than a predetermined reference value NESOLMON. This determination is carried out to determine whether or not the engine 4 is in operation. To this end, the reference value NESOLMON is set to a value (e.g. 500 rpm) at which the engine 4 can be positively presumed to be in operation.

If the answer to the question of the step 11 is affirmative (YES), i.e. if the engine 4 is in operation, the process proceeds to a step 12, wherein it is determined whether or not an INGEAR flag F_FCLE is equal to 1. The INGEAR flag F_FCLE is set to 1 when the rotation of the engine 4 is transmitted to the main shaft 21, that is, to the drive pulley 22 via the forward/backward travel-switching mechanism 10 described hereinabove, and otherwise set to 0. More specifically, the INGEAR flag F_FCLE is set by comparing the difference between the engine rotational speed NE and the drive-pulley rotational speed NDR with a predetermined value.

If the answer to the question of the step 12 is affirmative (YES), i.e. if the rotation of the engine 4 is transmitted to the drive pulley 22 via the forward/backward travel-switching mechanism 10, it is judged that the conditions for executing the failure determination of the solenoid valves are satisfied, so that the process proceeds to a step 13, wherein an executable condition flag F_SOLMONEN is set to 1 to indicate the fact, followed by terminating the present process.

On the other hand, if any of the answers to the questions of the steps 10 to 12 is negative (NO), i.e. if any of the sensors 40 to 47 has failed, if the engine 4 is in stoppage, or if the rotation of the engine 4 is not transmitted to the drive pulley 22 via the forward/backward travel-switching mechanism 10, it is judged that the conditions for executing the failure determination of the solenoid valves are not satisfied, and the process proceeds to a step 14, wherein the executable condition flag F_SOLMONEN is set to 0 to indicate the fact, followed by terminating the present process.

Next, the travel incapability determining process in the step 2 will be described with reference to FIG. 7. In this process, first, it is determined in a step 20 whether or not a first travel incapability reference value NERUNNG is calculated by a TH-NERUNNG table shown in FIG. 8 according to the throttle valve opening TH. The first travel incapability reference value NERUNNG is for discriminating between a hill-climbing state of the vehicle 3 and a state of the same incapable of travel due to failure of the SC solenoid valve 33b. That is, when the vehicle 3 is climbing a hill, the throttle valve opening TH and a target clutch pressure PCCMD both become high, so that answers to questions of steps 25 and 26, referred to hereinafter, can both become affirmative. Therefore, to discriminate such a hill-climbing state of the vehicle 3 from failure of the SC solenoid value 33b, the first travel incapability reference value NERUNNG is compared with the engine speed NE in a step 28, referred to hereinafter. Further, as shown in FIG. 8, in this table, the first travel incapability reference value NERUNNG is set to a larger value as the throttle valve opening TH is larger. This is because the engine speed NE rises to a higher value as the throttle valve opening TH is larger.

Figure 9:
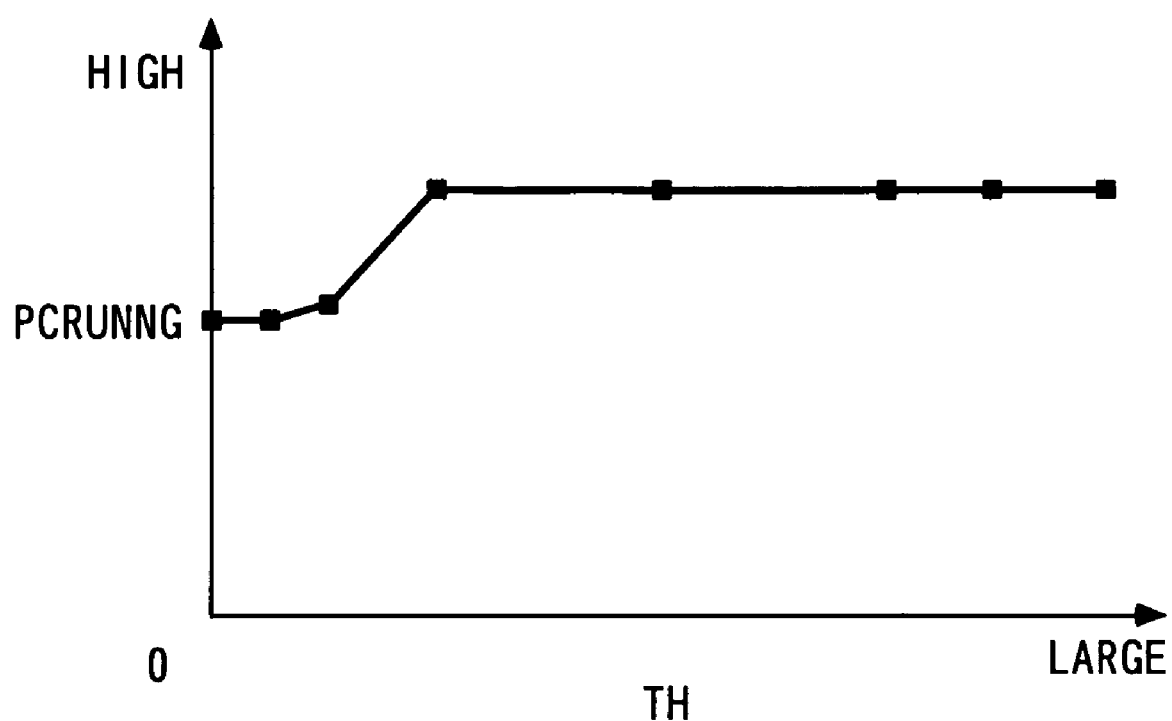
FIG. 9 is a diagram showing an example of a TH-NERUNG table for use in calculation of a second travel incapability reference value NERUNNG.

Next, the process proceeds to a step 21, wherein a second travel incapability reference value PCRUNNG is calculated by searching a TH-PCRUNNG table according to the throttle valve opening TH. The second travel incapability reference value PCRUNNG (defining a predetermined range of the input command) is compared with the target clutch pressure PCCMD in a step 27, referred to hereinafter, and as shown in FIG. 9, in this table, the second travel incapability reference value PCRUNNG is set to a larger value as the throttle valve opening TH is larger. This is because as the throttle valve opening is larger, the engine torque becomes larger, causing the target clutch pressure PCCMD to be set to a higher value.

Then, the process proceeds to a step 22, wherein it is determined whether or not the executable condition flag F_SOLMONEN is equal to 1. If the answer to this question is affirmative (YES), which means that the conditions for executing the solenoid valve failure determination are satisfied, the process proceeds to a step 23, wherein it is determined whether or not the driven-pulley rotational speed NDN is higher than a predetermined reference value NDN-REF. This determination is for determining whether the driven pulley 23 is rotating, and to this end, the reference value NDNREF is set to a value (e.g. 3 rpm) at which the driven pulley can be positively presumed to be rotating.

If the answer to the question of the step 23 is affirmative (YES), which means that the driven pulley 23 is rotating, the process proceeds to a step 24, wherein it is determined whether or not the shift lever is in the D-range or S-range. If the answer to this question is affirmative (YES), the process proceeds to a step 25, wherein it is determined whether or not the vehicle speed VP is lower than a predetermined reference value VRUNNG. This determination is for determining whether or not the vehicle 3 is standing. To this end, the reference value VRUNNG is set to a value (e.g. 3 km/h) at which the vehicle 3 can be positively presumed to be standing.

If the answer to this question is affirmative (YES), which means that the vehicle 3 is standing, the process proceeds to a step 26, wherein it is determined whether or not the throttle valve opening TH is equal to or larger than a predetermined reference value THRUN (e.g. 6.25%). If the answer to this question is affirmative (YES), which means the accelerator pedal is stepped on by the driver, causing the throttle valve opening TH to be larger than the reference value THRUN, the process proceeds to a step 27, wherein it is determined whether or not the target clutch pressure PCCMD is equal to or higher than the second travel incapability reference value PCRUNNG.

This target clutch reference value PCCMD (corresponding the input command) is a target value of oil pressure to be supplied to the clutch chamber 33a via the SC solenoid valve 33b for control of the engaging force of the start clutch 30, and the command input SCCMD to the SC solenoid valve 33b is set based on the target clutch pressure PCCMD. More specifically, the input command SCCMD is set to a larger value as the target clutch pressure PCCMD is higher, whereby the degree of valve opening of the SC solenoid valve 33b is controlled to a larger value, thereby controlling the engaging force of the start clutch 30 to a larger value. It should be noted that the target clutch pressure PCCMD is set to a value obtained by adding the pressure of return spring to the product of the engine torque PME, the transmission ratio RATIO, and a predetermined coefficient. The engine torque PME is determined based on the engine speed NE and the intake pipe absolute pressure PBA (or the throttle valve opening TH).

If the answer to the question of the step 27 is affirmative (YES), i.e. if PCCMD≧PCRUNNG holds, which means that the input command SCCMD to the SC solenoid valve 33b is set to a predetermined value or higher, the process proceeds to a step 28, wherein it is determined whether or not the engine speed NE is equal to or higher than the first travel incapability reference value NERUNNG. If the answer to this question is affirmative, i.e. if NE≧NERUNNG holds, it is provisionally determined that the vehicle 3 is not climbing a hill, but is incapable of traveling because of the failure of the SC solenoid valve 33b, so that the process proceeds to a step 29, wherein to indicate the provisional determination, a travel incapability provisional determination flag F_RUNNGZN is set to 1.

Then, the process proceeds to a step 30, wherein a counter value RUNNGCON of a travel incapability provisional determination counter is incremented by 1. Thereafter, the process proceeds to a step 31, wherein it is determined whether or not the counter value RUNNGCON is equal to or larger than a predetermined reference value RUNNGJD (e.g. 200). If the answer to this question is affirmative (YES), which means that the state in which the vehicle 3 is incapable of traveling is detected or provisionally determined a predetermined number (equal to the reference value RUNNGJD) of times or more, it is finally determined that the vehicle 3 is incapable of traveling, so that the process proceeds to a step 32, wherein to indicate the determination, a travel incapability determination flag F_RUNNGJD is set to 1, followed by terminating the present process.

On the other hand, if the answer to the question of the step 31 is negative (NO), which means that the counter value RUNNGCON has not reached the predetermined reference value RUNNGJD, the process proceeds to a step 35, wherein the travel incapability determination flag F_RUNNGJD is set to 0, followed by terminating the present process.

Further, if any of the answers to the questions of the steps 22 to 24, and 26 to 28 is negative (NO), i.e. if the conditions for executing the solenoid valve failure determination are not satisfied, if the driven-pulley 23 is in stoppage, if the shift lever is neither in the D-range nor in the S-range, if the throttle valve opening TH is smaller than the reference value THRUN, if the target clutch pressure PCCMD is lower than the second travel incapability reference value PCRUNNG, or if the engine speed NE is lower than the first travel incapability reference value NERUNNG, as well, the step 35 is executed, followed by terminating the present process.

On the other hand, if the answer to the question of the step 25 is negative (NO), which means that the vehicle 3 is traveling, the process proceeds to a step 33, wherein the counter value RUNNGCON of the travel incapability provisional determination counter is reset to 0, and then in a step 34, the travel incapability determination reference flag F_RUNNGJD is set to 0. Thereafter, the step 35 is executed, followed by terminating the present process.

Next, the fixation determination process for determining fixation of the SC solenoid valve 33b executed in the step 3 will be described with reference to FIG. 10. In this process, first, in a step 40, it is determined whether or not the executable condition flag F_SOLMONEN is equal to 1. If the answer to this question is affirmative (YES), which means that the conditions for executing the solenoid valve failure determination are satisfied, the process proceeds to a step 41, wherein it is determined whether or not the shift lever is in the D-range or S-range.

If the answer to this question is affirmative (YES), i.e. if the shift lever is in the D-range or S-range, the process proceeds to a step 42, wherein it is determined whether or not the travel incapability determination flag F_RUNNNGJD is equal to 1. If the answer to this question is affirmative (YES), which means that the vehicle 3 is incapable of traveling, the process proceeds to a step 43, wherein to indicate the fact that the SC solenoid valve 33b is fixed in the fully-closed state, an SC solenoid valve failure flag F_FSKSC is set to 1.

Then, the process proceeds to a step 44, wherein an SC solenoid normality flag F_OKSC for indication of normality of the SC solenoid valve 33b is set to 0, and then proceeds to a step 45, wherein a counter value CTOKSC of a normality provisional determination counter, referred to hereinafter, is reset to 0.

Then, the process proceeds to a step 46, wherein a post-determination process is executed. In this process, the values of the SC solenoid valve failure flag F_FSCKS and the solenoid valve normality flag F_OKSC are written in the backup RAM, followed by terminating the present process.

On the other hand, if the answer to the question of the step 42 is negative (NO), i.e. if the vehicle 3 is capable of traveling, the process proceeds to a step 47, wherein it is determined whether or not the vehicle speed VP is equal to or higher than a SC normality reference value VSCOK (e.g. 40 km/h). If the answer to this question is affirmative (YES), which means that the vehicle speed VP is sufficiently high, the process proceeds to a step 48, wherein it is determined whether or not the throttle valve opening TH is equal to or larger than an SC reference value THSCOK (e.g. 5%).

Figure 11:
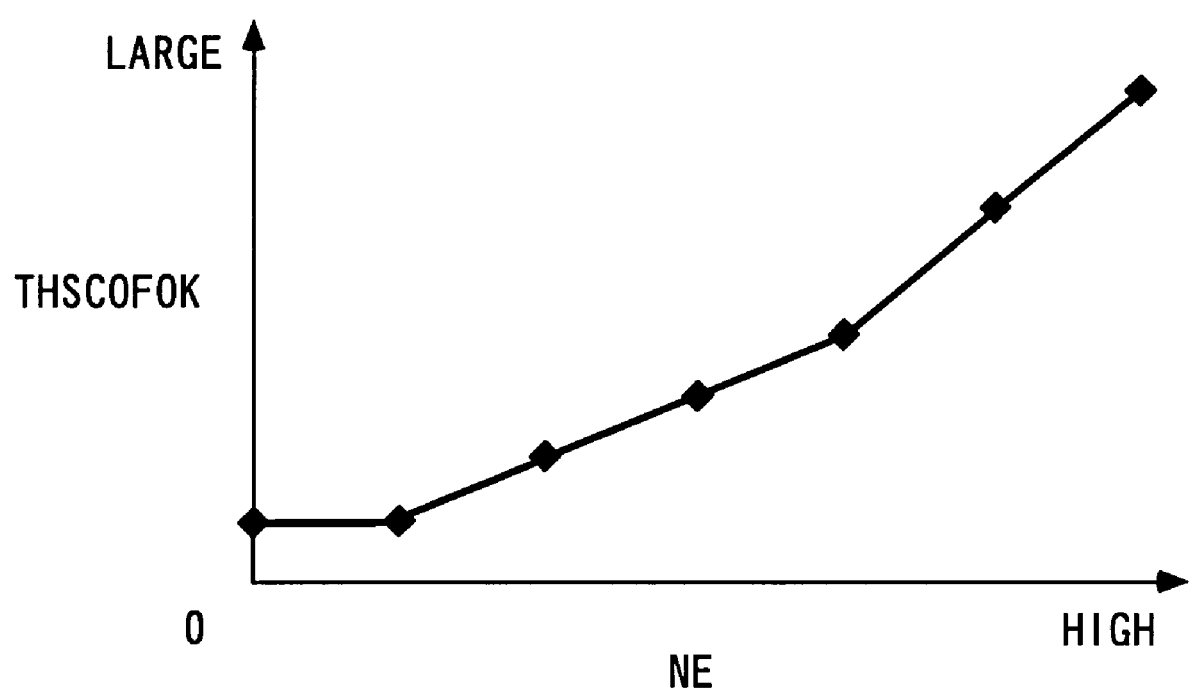
FIG. 11 is a diagram showing an example of a NE-THSCFOK table for use in calculation of an SC normality reference value THSCOFOK.

If the answer to this question is affirmative (YES), which means that the throttle valve is open, the process proceeds to a step 49, wherein an SC normality reference value THSCOFOK is calculated by searching an NE-THSCOFOK table according to the engine speed NE. The SC normality reference value THSCOFOK is for determining normality determination of the SC solenoid valve 33b, and as shown in FIG. 11, in this table, the SC normality reference value THSCOFOK is set to a larger value as the engine speed NE is higher.

This is because in the control of the throttle valve, as the engine speed NE is higher, the throttle valve opening TH is set to a larger value.

Then, the process proceeds to a step 50, wherein it is determined whether or not the throttle valve opening TH is smaller than the SC normality reference value THSCOFOK. If the answer to this question is affirmative (YES), it is judged that the SC solenoid valve 33b cannot be regarded as normal, so that the process proceeds to the step 45, wherein the counter value CTOKSC of the normality provisional determination counter is reset to 0. Then, the step 46 is executed, followed by terminating the present process.

On the other hand, if the answer to the question of the step 50 is negative (NO), it is judged that the SC solenoid valve 33b can be regarded as normal, so that the process proceeds to a step 53, wherein to indicate the fact, the SC solenoid valve failure flag F_FSKSC is set to 0. Then, the process proceeds to a step 54, wherein the counter value CTOKSC of the normality provisional determination counter is incremented by 1.

Then, the process proceeds to a step 55, wherein it is determined whether or not the counter value CTOKSC is equal to or larger than a predetermined normality reference value CTOKREF (e.g. 500). If the answer to this determination is negative (NO), the step 46 is executed, followed by terminating the present process, whereas if the answer is affirmative (YES), which means that a state in which the SC solenoid valve 33b can be regarded as normal has continued for a predetermined time period or longer, the process proceeds to a step 56, wherein to indicate that the SC solenoid valve 33b is normal, the SC solenoid normality flag F_OKSC is set to 1, and then the step 46 is executed, followed by terminating the present process.

On the other hand, if the answer to the question of the step 48 is negative (NO), i.e. if the throttle valve is almost closed, the process proceeds to a step 51, wherein it is determined whether or not a deceleration F/C flag F_DECFC is equal to 1. The deceleration F/C flag F_DECFC is set to 1 when the fuel cut operation is being carried out during deceleration, and otherwise set to 0.

If the answer to this question is affirmative (YES), which means that the F/C operation is being carried out during deceleration, the process proceed to a step 52, wherein it is determined whether or not the slip ratio ESC of the start clutch 30 is equal to or higher than a predetermined lower limit value ESCOKL (e.g. 95%), and at the same time equal to or lower than a predetermined upper limit value (e.g. 105%). If the answer to this question is affirmative (YES), which means that the start clutch 30 scarcely slips, it is judged, similarly to the case of the answer to the question of the step 50 being negative (NO), that the SC solenoid valve 33b can be regarded as normal, so that the process proceeds to the step 53, wherein to indicate the fact, the SC solenoid valve failure flag F_FSKSC is set to 0. Then, the step 54 et seq. are executed as described hereinabove, followed by terminating the present process.

On the other hand, if any of the answers to the questions of the step 47, 51, and 52 is negative (NO), i.e. if the vehicle speed VP is not sufficiently high, if the F/C operation is not being performed during deceleration, if the start clutch 30 slips too much, or if the vehicle is being engine-braked, the process proceeds to a step 57, wherein similarly to the step 45, the counter value CTOKSC of the normality provisional determination counter is reset to 0. Then, the step 46 is executed, followed by terminating the present process.

If either of the answers to the questions of the steps 40 and 41 is negative (NO), i.e. if the conditions for executing the solenoid valve failure determination are not satisfied, or if the shift lever is neither in the D-range nor in the S-range, the steps 45 and 46 are executed, followed by terminating the present process.

Figure 7:
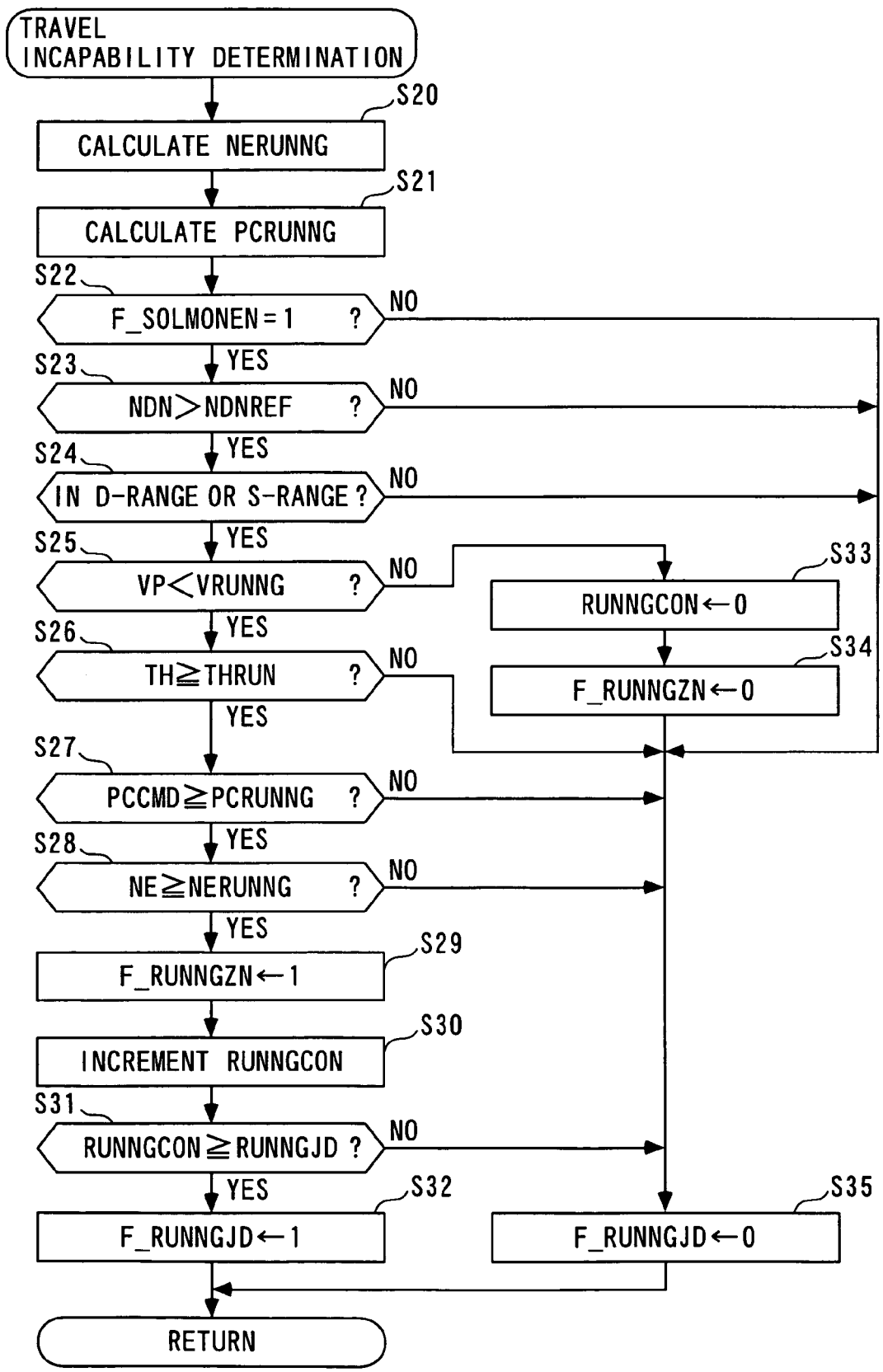
FIG. 7 is a flowchart showing a subroutine carried out for a travel incapability determining process.
Figure 8:
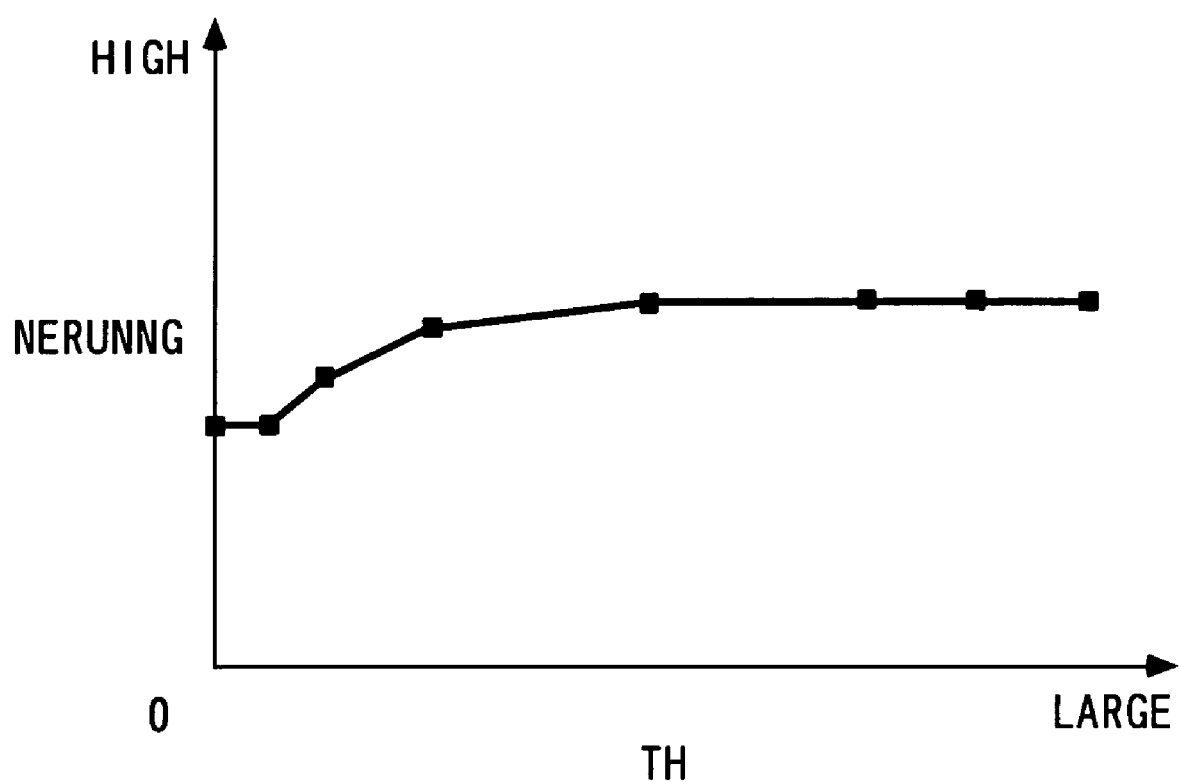
FIG. 8 is a diagram showing an example of a TH-NERUNG table for use in calculation of a first travel incapability reference value NERUNNG.
Figure 10:
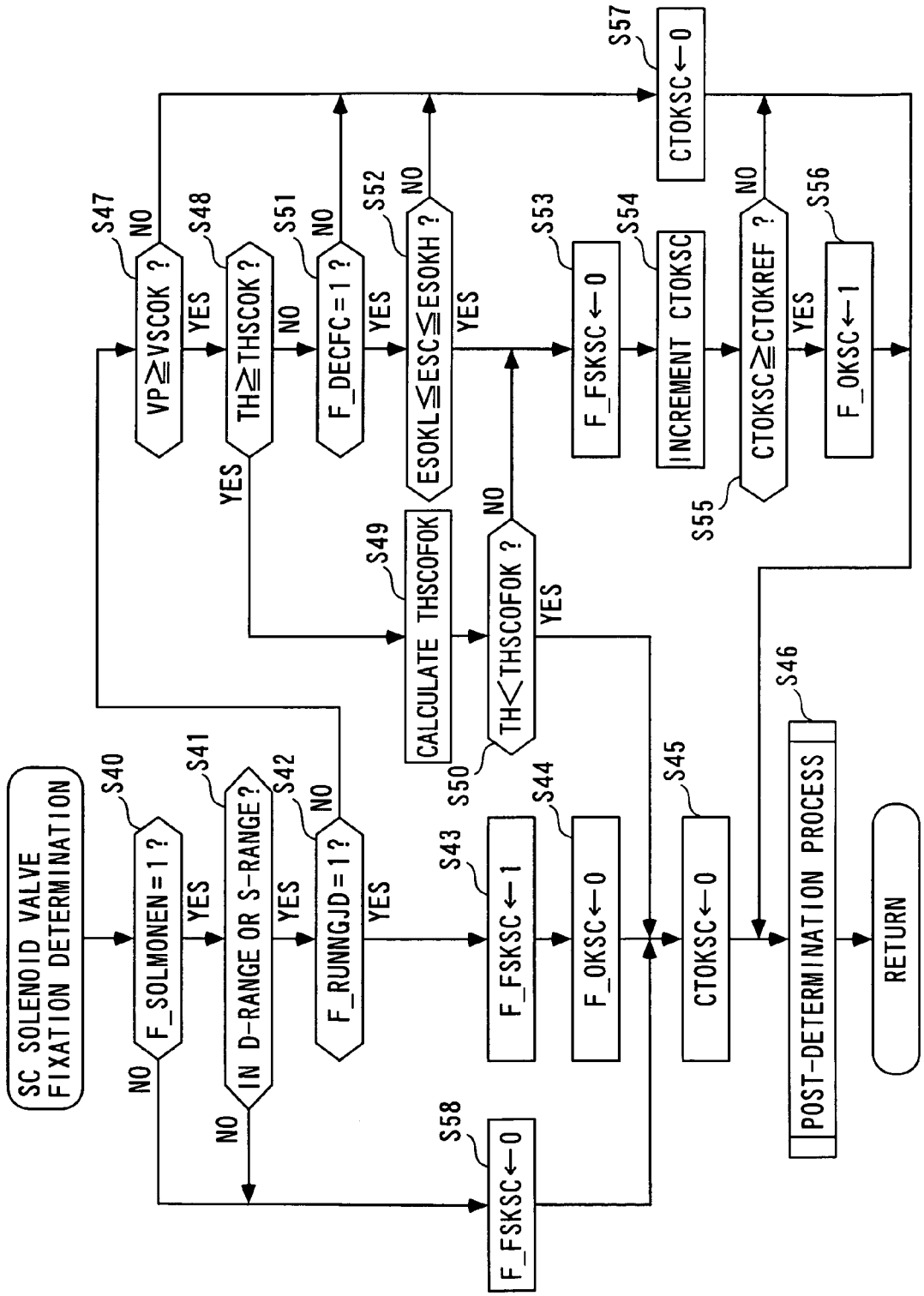
FIG. 10 is a flowchart showing a subroutine carried out for a fixation determining process for determining fixation of an SC solenoid valve.

As described above, in the travel incapability determining process shown in FIG. 7 and the fixation determining process for the SC solenoid valve 33b shown in FIG. 10, on condition that the driven pulley 23 is rotating, that the shift lever is in the D-range or S-range, that the vehicle 3 is standing, that the throttle valve is sufficiently wide open, that the input command SCCMD to the SC solenoid valve 33b is large, and that the engine speed NE is high, it is determined that the vehicle 3 is incapable of traveling (F_RUNNGJD←1), and at the same time, when such a determination that the vehicle 3 is incapable of traveling is made, it is determined that the SC solenoid valve 33b is fixed in the fully-closed state. This is for the following reason:

Firstly, since the driven pulley 23 is rotating, it is presumed that the torque is transferred to the start clutch 30. In this state, assuming that the SC solenoid valve 33b is normal, as indicated by curves of broken lines in FIG. 12, when the accelerator pedal is stepped on at the standing start of the vehicle 3, causing the throttle valve TH to increase, the engine speed NE and the target clutch pressure PCCMD both increase, and the vehicle speed VP increases accordingly.

Figure 12:
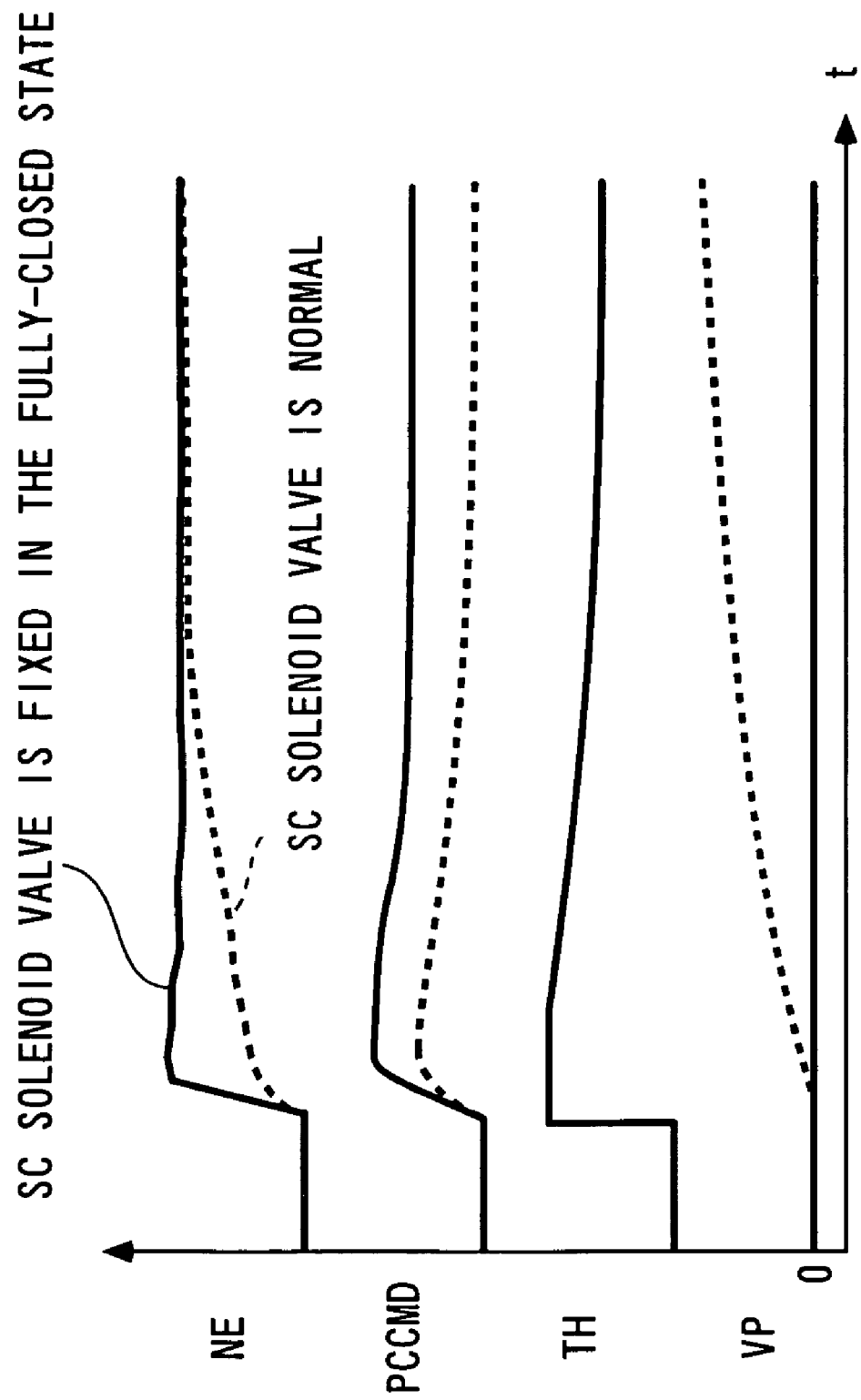
FIG. 12 is a timing chart showing an example of operations executed in a case (indicated by curves of broken lines) in which the SC solenoid valve is normal, and a case (indicated by curves of solid lines) in which the SC solenoid valve is fixed in the fully-closed state.

In contrast, if the SC solenoid valve 33b is fixed in the fully-closed state, as shown in curves of solid lines in FIG. 12, when the accelerator pedal is stepped on to cause the throttle valve TH to increase, in spite of the fact that the engine speed NE and the target clutch pressure PCCMD both rise to values higher than those assumed when the SC solenoid valve 33b is normal, the vehicle speed VP remains equal to 0, i.e. the vehicle 3 is standing. In other words, even if the supply of oil pressure from the hydraulic circuit 28 is short, in spite of the fact that the target clutch pressure PCCME has risen to a value high enough to provide the sufficiently strong engaging force of the start clutch 30 enabling the vehicle 3 to make a standing start, in other words, in spite of the input command SCCMD being large enough, the vehicle is still standing. Therefore, it can be determined that the SC solenoid valve 33b is fixed in the fully-closed state, causing the disengaged state of the start clutch 30, which inhibits the engine torque from being transferred to the drive wheels 7. Further, when the vehicle 3 is climbing a hill, the throttle valve opening TH becomes large, and the target clutch pressure PCCMD becomes high. However, the engine speed NE does not rise so high as in the case of the fixation of the SC solenoid valve 33b, which makes it possible to discriminate the two cases from each other. Thus, based on the various conditions described above, it is possible to determine whether or not the SC solenoid valve 33b is fixed in the fully-closed state.

As described above, according to the failure determination system 1 of the present embodiment, based on the various conditions described above, it is possible to determine whether or not the SC solenoid valve 33b is fixed in the fully-closed state, irrespective of shortage of supply of oil pressure from the hydraulic circuit 28, and identify the failure of the SC solenoid valve 33b. As a consequence, it is possible to easily repair the start clutch 30 simply by replacing the SC solenoid valve 33b, and thereby improve maintainability thereof.

Next, the fixation determining process for determining whether any of the DR solenoid valve 26b and the DN solenoid valve 27b is fixed, executed in the step 4 will be described with reference to FIG. 13. In this process, first, a stop-time transmission ratio determining process is carried out in a step 120.

Figure 14:
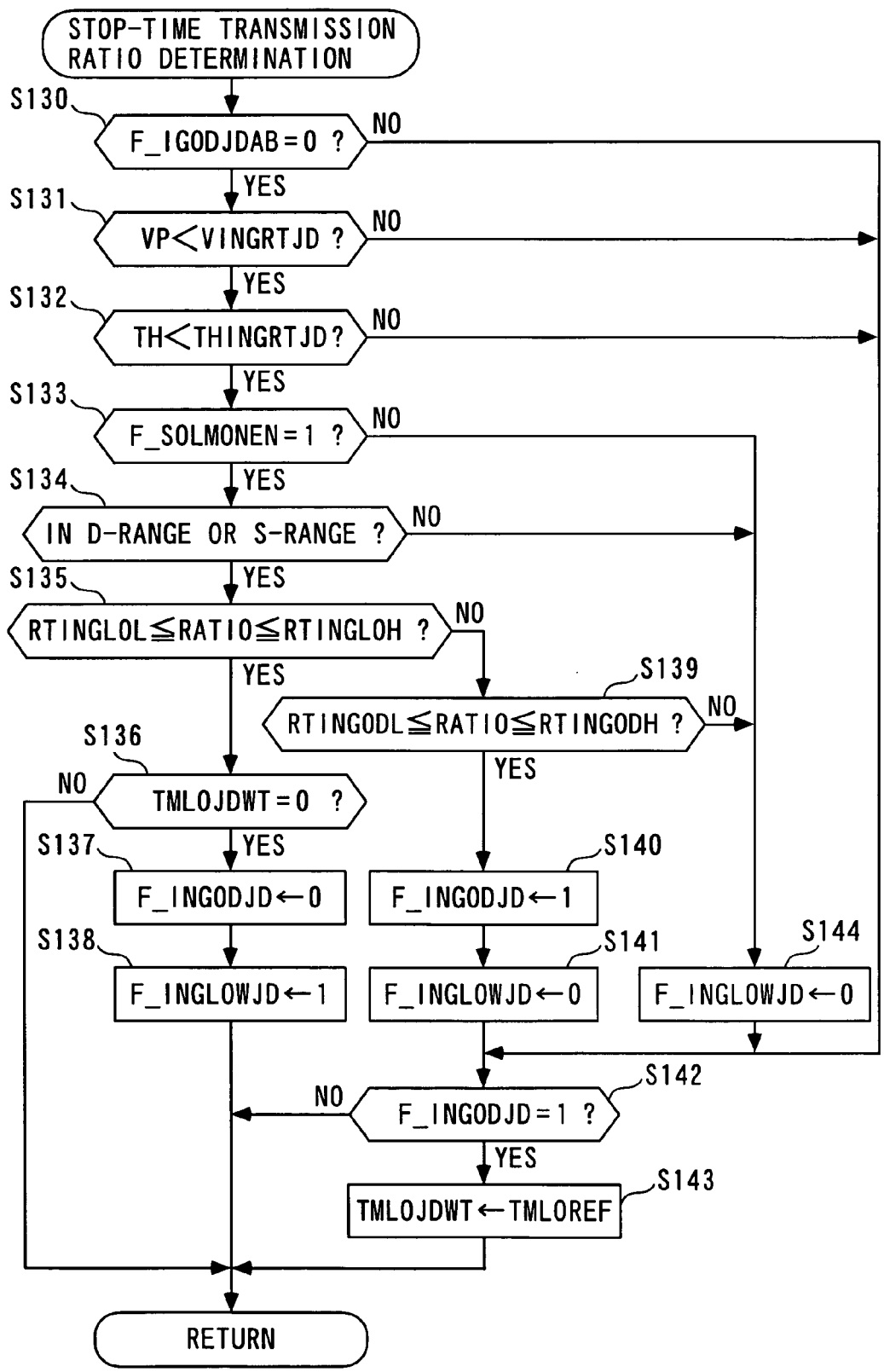
FIG. 14 is a flowchart showing a subroutine carried out for a stop-time transmission ratio determining process.

Referring to FIG. 14, in the stop-time transmission ratio determining process, first, in a step 130, it is determined whether or not a rapid deceleration-time determination inhibition flag F_IGDJDAB is equal to 0. The rapid deceleration-time determination inhibition flag F_IGDJDAB is set to 1 when the vehicle 3 is being rapidly decelerated, and otherwise set to 0. More specifically, the rapid deceleration-time determination inhibition flag F_IGDJDAB is set based on the drive-pulley rotational speed NDR, and the difference between the immediately preceding value and present value of vehicle speed VP (i.e. acceleration).

If the answer to the above question is affirmative (YES), i.e. if the vehicle 3 is not being rapidly decelerated, it is judged that the stop-time transmission ratio determining process should be executed, so that the process proceeds to a step 131, wherein it is determined whether or not the vehicle speed VP is lower than a predetermined stop-time reference value VINGRTJD. The stop-time reference value VINGRTJD is set to a value at which the transmission ratio RATIO can be positively presumed to have returned to a LOW side thereof if both of the solenoid valves 26b and 27b are normal.

If the answer to the above question is affirmative (YES), i.e. if the vehicle 3 is standing, the process proceeds to a step 132, wherein it is determined whether or not the throttle valve opening TH is smaller than a predetermined stop-time reference value THINGRTJD. The stop-time reference value THINGRTJD is for determining whether or not the throttle valve is in the closed state, i.e. whether or not the accelerator pedal is not stepped on, and set to a value (e.g. 5%) at which the throttle valve is expected to be closed.

If the answer to the above question is affirmative (YES), i.e. if the throttle valve is in the closed state, the process proceeds to a step 133, wherein it is determined whether or not the executable condition flag F_SOLMONEN is equal to 1. If the answer to this question is affirmative (YES), i.e. if the conditions for executing the solenoid valve failure determination are satisfied, the process proceeds to a step 134, wherein it is determined whether or not the position of the shift lever is in the D-range or S-range.

If the answer to this question is affirmative (YES), the process proceeds to a step 135, wherein it is determined whether or not the transmission ratio RATIO is in a predetermined stop-time LOW-side range. More specifically, the stop-time LOW-side range is set to a range between a LOW-side lower limit value RTINGLOL (e.g. 1.8) and a LOW-side higher limit value RTINGLOH (e.g. 2.5), which is the same range as a LOW-side range applied to the fixation determining process, referred to hereinafter. If the answer to the above question is affirmative (YES), i.e. if RTINGLOL≦RATIO≦RTINGLOH holds, the process proceeds to a step 136, wherein it is determined whether or not a timer value TMLOJDWT of a delay timer is equal to 1.

The delay timer is of a downcount type whose timer value TMLOJDWT is set to 0 as an initial value at the start of the engine 4, and as described hereinafter, set to a predetermined value TMLOREF (e.g. 2.0 sec) when a stop-time OD-side flag F_INGODJD is equal to 1. The delay timer is used for the following reason: Immediately after the accelerator pedal is suddenly stepped on to cause the belt 24 to slip between the pulleys 22 and 23, if the accelerator pedal is released, the transmission ratio RATIO can temporarily fall within the stop-time LOW-side S-range, so that there is a fear of being erroneously determined that the transmission ratio RATIO is within the stop-time LOW-side range although actually not in the range. To prevent such an erroneous determination, the delay timer is used.

If the answer to the question of the step 136 is negative (NO), i.e. if the delay timer has not completed counting of the predetermined value TMLOREF, it is judged that there is a fear of the erroneous determination, and hence the present process is immediately terminated. On the other hand, if the answer to the question of the step 136 is affirmative (YES), i.e. if the delay timer has completed counting of the predetermined value TMLOREF, it is judged that the transmission ratio RATIO is in the stop-time LOW-side range, and to indicate the fact, in a step 137, the stop-time OD-side flag F_INGODJD is set to 0, and in a step 138, a stop-time LOW-side flag F_INGLOWJD is set to 1, followed by terminating the present process.

On the other hand, if the answer to the question of the step 135 is negative (NO), i.e. if the transmission ratio RATIO is not in the stop-time LOW-side range, the process proceeds to a step 139, wherein it is determined whether or not the transmission ratio RATIO is within a predetermined stop-time OD-side range. The stop-time OD(high-speed)-side range) is a range on the OD-side lower than the above stop-time LOW-side range. More specifically, the stop-time OD-side range is set to a range between a lower limit value RTINGODL (e.g. 0.3) and a predetermined upper limit value RTINGODH (e.g. 0.8).

If the answer to this question is affirmative (YES), i.e. if RTINGODL≦RATIO≦RTINGODH holds, it is judged that the transmission ratio RATIO is within the stop-time OD-side range, and to indicate the fact, in a step 140, the stop-time OD-side flag F_INGODJD is set to 1, and in a step 141, the stop-time LOW-side flag F_INGLOWJD is set to 0.

Then, the process proceeds to a step 142, wherein it is determined whether or not the stop-time OD-side flag F_INGODJD is equal to 1. If the answer to this question is negative (NO), the present process is immediately terminated. On the other hand, if the answer to the question is affirmative (YES), the process proceeds to a step 143, wherein the timer value TMLOJDWT of the delay timer is set to the predetermined value TMLOREF for the above-described reason, followed by terminating the present process.

On the other hand, if any of the answers to the questions of the steps 133, 134, and 139 is negative (NO), i.e. if the conditions for executing the solenoid valve failure determination are not satisfied, if the position of the shift lever is in a range other than the D-range and S-range, or if the transmission ratio RATIO is neither in the stop-time LOW-side range nor in the stop-time OD-side range, the process proceeds to a step 144, wherein the stop-time LOW-side flag F_INGLOWJD is set to 0. Then, the step 142 et seq. are carried out as described hereinabove, followed by terminating the present process.

On the other hand, if any of the answers to the questions of the steps 130 to 132 is negative (NO), i.e. if the vehicle 3 is being rapidly decelerated, if the vehicle 3 is not standing, or if the accelerator pedal is stepped on to thereby cause the throttle valve to be open, the step 144 is executed, and then the step 142 et seq. are carried out as described above, followed by terminating the present process.

As described hereinabove, in the stop-time transmission ratio determining process, the values of the stop-time OD-side flag F_INGODJD and the stop-time LOW-side flag F_INGLOWJD are set.

Referring again to FIG. 13, in a step 121 following the step 120, it is determined whether or not the executable condition flag F_SOLMONEN is equal to 1. If the answer to this question is affirmative (YES), i.e. if the conditions for executing the solenoid valve failure determination are satisfied, the process proceeds to a step 122, wherein it is determined whether or not the position of the shift lever is in the D-range or S-range. If the answer to this question is affirmative (YES), the process proceeds to a step 123, wherein it is determined whether or not the stop-time OD-side flag F_INGODJD is equal to 1.

If the answer to this question is affirmative (YES), which means that the transmission ratio RATIO during stoppage of the vehicle 3 was within the stop-time OD-side range, the process proceeds to a step 124, wherein an OD-side determining process is carried out, as will be described hereinafter. On the other hand, if the answer to the above question is negative (NO), which means that the transmission ratio RATIO during stoppage of the vehicle 3 was not within in the stop-time OD-side range, the process proceeds to a step 125, wherein a LOW-side determining process is carried out, as will be described hereinafter.

In a step 126 following the step 124 or the step 125, a post-determination process is executed. In the post-determination process, the values of the flags set by the stop-time transmission ratio determining process, and the OD-side determining process or the LOW-side determining process are stored in the backup RAM, followed by terminating the present process.

Figure 15:
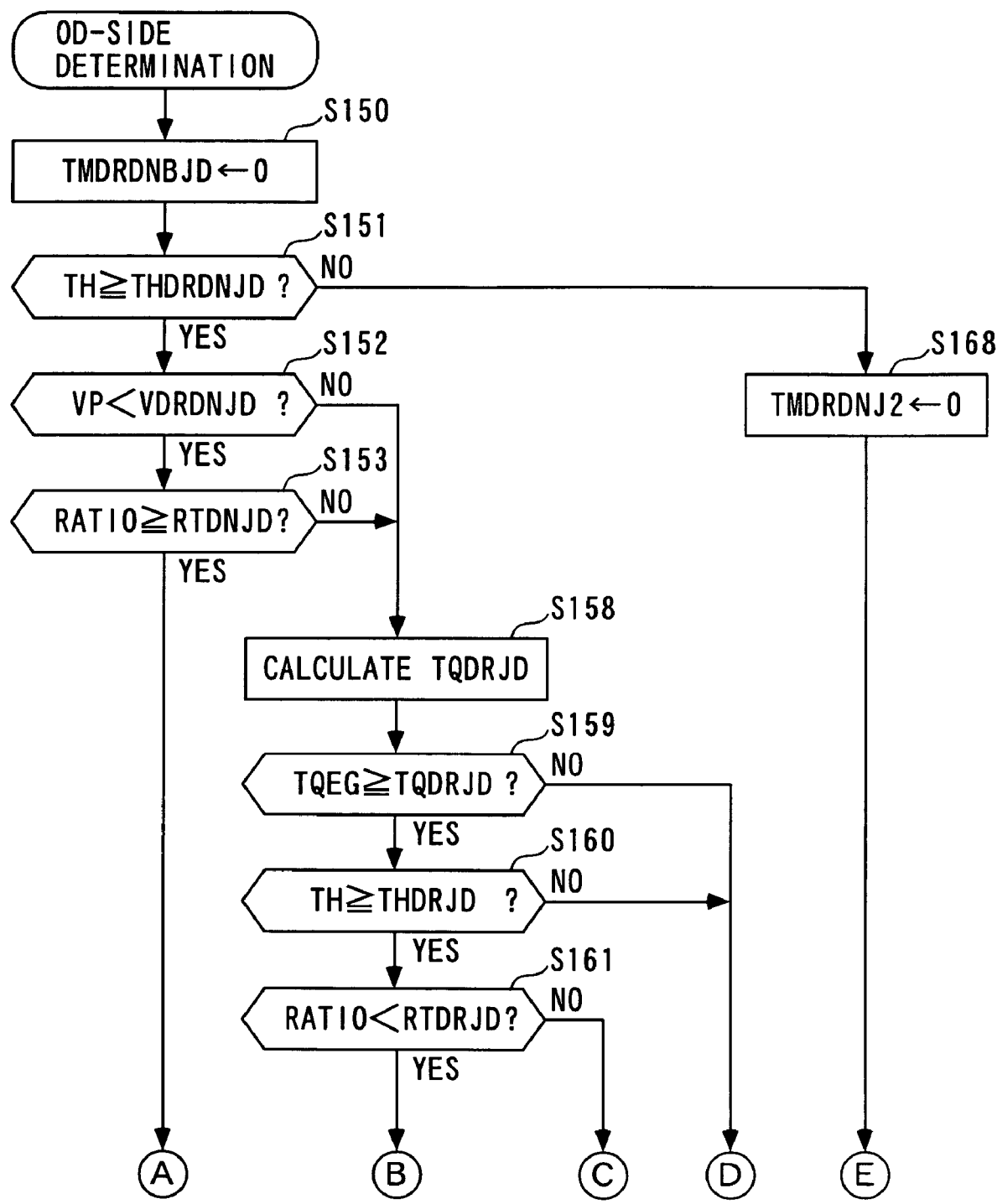
FIG. 15 is a flowchart showing a subroutine carried out for an OD-side determining process.

Next, the OD-side determining process carried out in the step 124 will be described with reference to FIGS. 15 and 16. This process is carried out to determine whether or not the DR solenoid valve 26*b* is fixed in the fully-open state, and/or whether or not the DN solenoid valve 27*b* is fixed in the fully-closed state. More specifically, the OD-side determining process is carried out as follows:

First, in a step 150 shown in FIG. 15, a timer value TMDRDNBJD of a LOW-side determination timer of an upcount type is set to a value of 0. The LOW-side determination timer will be described hereinafter.

Then, the process proceeds to a step 151, wherein it is determined whether or not the throttle valve opening TH is equal to or larger than a predetermined OD-side reference value THDRDNJD (e.g. 5%). If the answer to this question is negative (NO), i.e. if the accelerator pedal is not stepped on by the driver, causing the throttle valve to be substantially fully closed, the process proceeds to a step 168, wherein a timer value TMDRDNJ2 of a second OD-side determination timer of the upcount type is set to 0.

Figure 16:
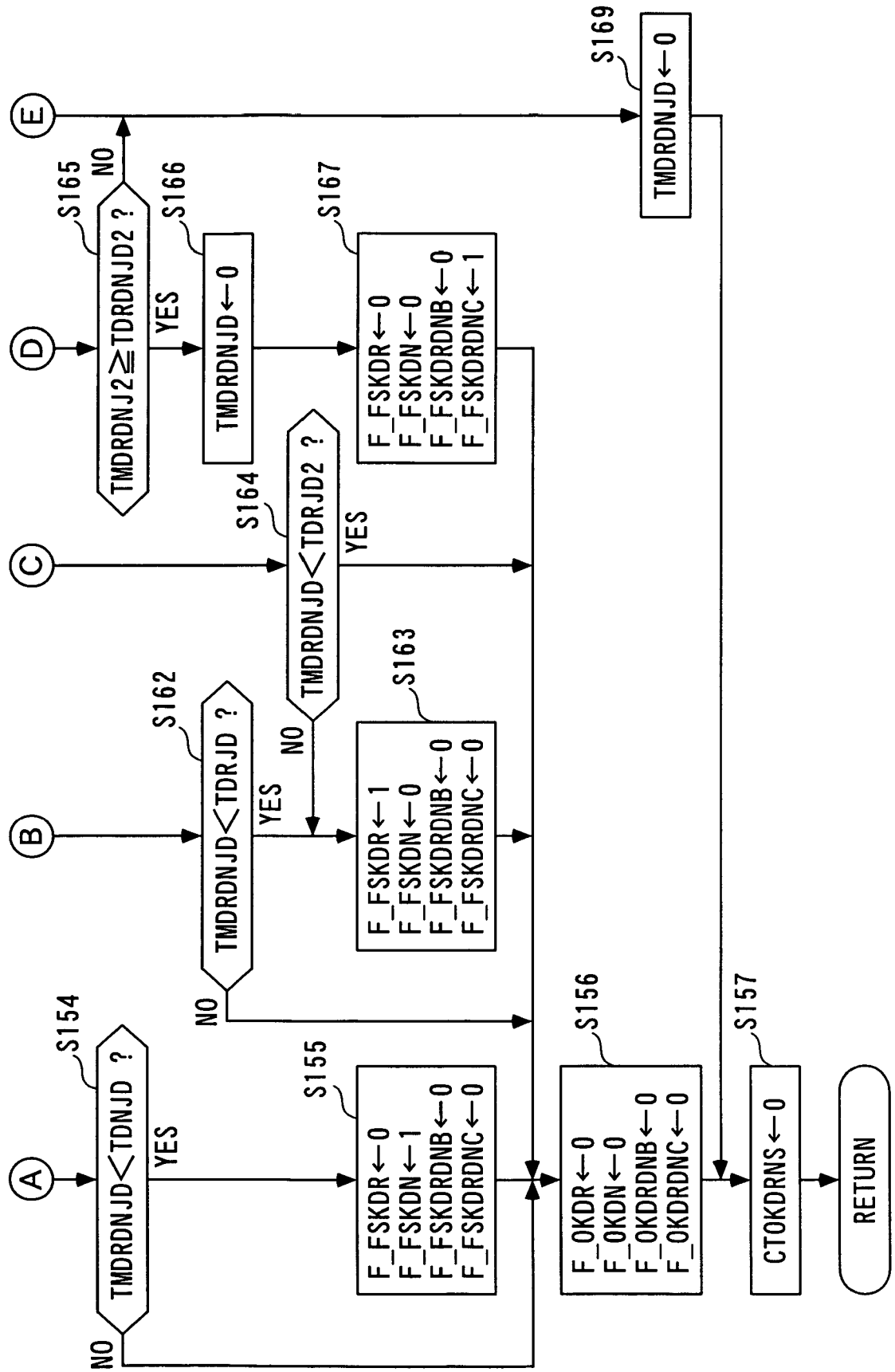
FIG. 16 is a continuation of the FIG. 15 flowchart.

Then, the process proceeds to a step 169 in FIG. 16, wherein a timer value TMDRDNJD of a first OD-side determination timer of the upcount type is set to 0. Then, the process proceeds to a step 157, wherein a timer value CTOKDRNS of a DRDN normality provisional determination counter is set to 0, followed by terminating the present process.

On the other hand, if the answer to the question of the step 151 is affirmative (YES), i.e. if the accelerator pedal is stepped on by the driver, causing the throttle valve to be open, the process proceeds to a step 152, wherein it is determined whether or not the vehicle speed VP is lower than a predetermined OD-side reference value VDRDNJD (second predetermined vehicle speed, e.g. 15 km/h).

If the answer to this question is affirmative (YES), i.e. if the vehicle speed VP is low, the process proceeds to a step 153, wherein it is determined whether or not the transmission ratio RATIO is equal to or higher than a predetermined DN-side reference value RTDNJD. This determination is for determining whether or not a significant slippage of the belt 24 is occurring. To this end, the DN-side reference value RTDNJD (low-speed transmission ratio) is set to a value (e.g. 3.0) indicative of occurrence of a significant slippage of the belt 24. If the answer to this question is affirmative (YES), it is regarded that the DN solenoid valve 27*b* is fixed in the fully-closed state, causing a significant slippage of the belt 24, so that the process proceeds to a step 154 in FIG. 16, wherein it is determined whether or not the timer value TMDRDNJD of the first OD-side determination timer of the upcount type is equal to or larger than a predetermined DN-side reference value TDNJD (corresponding to e.g. 0.2 seconds).

If the answer to this question is affirmative (YES), i.e. if a state where the significant slippage of the belt 24 is occurring has continued for a predetermined time period corresponding to the predetermined DN-side reference value TDNJD or longer, it is judged that the DN solenoid valve 27*b* is fixed in the fully-closed state, so that the process proceeds to a step 155, wherein to indicate the fact, an OD-time DN-side failure flag F_FSKDN is set to 1, and at the same time an OD-time DR-side failure flag F_FSKDR, a LOW-time DRDN failure flag F_FSKDRDNB, and an OD-time DRDN failure flag F_FSKDRDNC are all set to 0.

Then, the process proceeds to a step 156, wherein an OD-time DN-side normality flag F_OKDN, an OD-time DR-side normality flag F_OKDR, a LOW-time DRDN normality flag F_OKDRDNB, and an OD-time DRDN normality flag F_OKDRDNC are all set to 0. Then, the step 157 is carried out, as described above, followed by terminating the present process.

Figure 17:
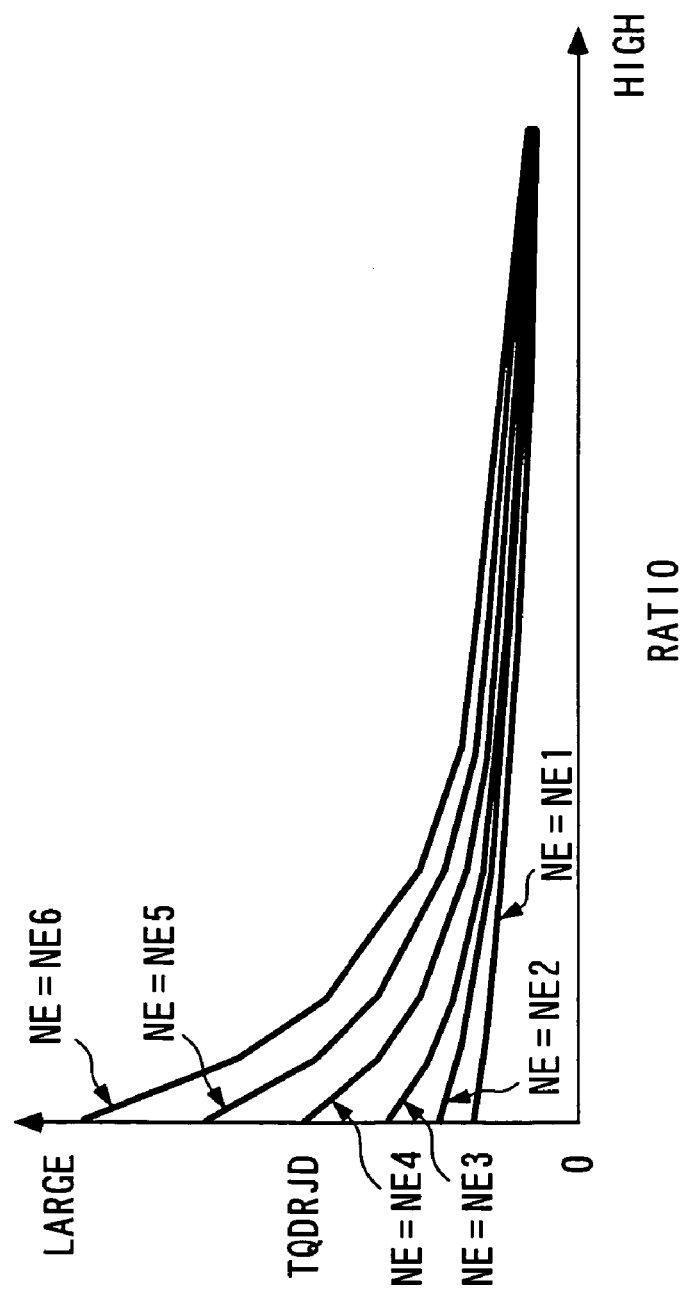
FIG. 17 is a diagram showing an example of a TH-RATIO-TQDRJD map for use in calculation of OD-time DR-side reference torque TQDRJD.

Referring again to FIG. 15, if either of the answers to the questions of the steps 152 and 153 is negative (No), i.e. if the vehicle speed VP is relatively high, or if the transmission ratio RATIO does not assume a value indicative of occurrence of a significant slippage of the belt 24, the process proceeds to a step 158, wherein the value of an OD-time DR-side reference torque TQDRJD (predetermined torque) is calculated by searching a map shown in FIG. 17 according to the engine rotational speed NE and the transmission ratio RATIO.

As described hereinafter, the OD-time DR-side reference torque TQDRJD is for comparison with engine torque TQEG (torque from the drive source), and set, with respect to the engine rotational speed NE and the transmission ratio RATIO, to a slightly larger value than the upper limit value of the engine torque TQEG transferable when the continuously variable transmission 20 is faulty. In FIG. 17, six values NE1 to NE6 of the engine rotational speed NE are set such that they have a relationship of NE1<NE2<NE3<NE4<NE5<NE6. Further, the OD-time DR-side reference torque TQDRJD is set to a larger value as the engine rotational speed NE is higher or as the transmission ratio RATIO is smaller (i.e. as the transmission ratio RATIO is more toward the OD side). This is because as the engine rotational speed NE is higher or as the transmission ratio RATIO is more toward the OD side, the slippage of the belt 24 is harder to occur, even when the engine torque TQEG generated by the engine 4 is large.

Next, the process proceeds to a step 159, wherein it is determined whether or not the engine torque TQEG is equal to or larger than the OD-time DR-side reference torque TQDRJD set in the step 158. The engine torque TQEG is calculated according to the engine rotational speed NE and the intake pipe absolute pressure PBA. If the answer to this question is affirmative (YES), i.e. if TQEG≧TQDRJD holds, which means that the slippage of the belt 24 is expected to occur owing to the significant engine torque TQEG, the process proceeds to a step 160, wherein it is determined whether or not the throttle valve opening TH is equal to or larger than an OD-time DR-side reference value THDRJD (e.g. 37.5%).

If the answer to this question is affirmative (YES), i.e. if TH≧THDRJD holds, which means that the throttle valve opening TH is considerably large, the process proceeds to a step 161, wherein it is determined whether or not the transmission ratio RATIO is smaller than a predetermined OD-time DR-side reference value RTDRJD (e.g. 1.8).

If the answer to this question is affirmative (YES), i.e. if RATIO<RTDRJD holds, which means that the belt 24 is not slipping although both of the engine torque TQEG and the throttle valve opening TH are considerably large, the process proceeds to a step 162 in FIG. 16, wherein it is determined whether or not the timer value TMDRDNJD of the first OD-side determination timer is equal to or larger than a predetermined DR-side reference value TDRJD (corresponding to e.g. 10 seconds).

If the answer to this question is affirmative (YES), i.e. if a state in which the belt 24 is not slipping although both of the engine torque TQEG and the throttle valve opening TH are considerably large has continued for a predetermined time period corresponding to the predetermined DR-side reference value TDRJD or longer, it is judged that the DR solenoid valve 26b is fixed in the fully-open state, so that the process proceeds to a step 163, wherein to indicate the fact, the OD-time DR-side failure flag F_FSKDR is set to 1, and at the same time the above-mentioned three failure flags F_FSKDN, F_FSKDRDNB, and F_FSKDRDNC are all set to 0. Then, the steps 156 and 157 are executed as described above, followed by terminating the present process.

On the other hand, if the answer to the question of the step 161 is negative (NO), i.e. if RATIO≧RTDRJD holds, which means that both of the engine torque TQEG and the throttle valve opening TH are considerably large, and at the same time the belt 24 is slightly slipping, the process proceeds to a step 164 in FIG. 16, wherein it is determined whether or not the timer value TMDRDNJD of the first OD-side determination timer referred to hereinabove is equal to or larger than a predetermined second DR-side reference value TMDRJ2 (corresponding to e.g. 5 seconds).

If the answer to this question is affirmative (YES), i.e. if both of the engine torque TQEG and the throttle valve opening TH are considerably large, and a state where the belt 24 is slightly slipping has continued for a time period correspond to the predetermined second DR-side reference value TMDRJ2 or longer, it is judged that the DR solenoid valve 26b is fixed in the open state, and the step 163 is executed. Then, the steps 156 and 157 are executed as described above, followed by terminating the present process.

Referring again to FIG. 15, if either of the answers to the questions of the steps 159 and 160 is negative (No), i.e. if the engine torque TQEG is relatively small, or if the throttle valve opening TH is not very large, the process proceeds to a step 165 in FIG. 16, wherein it is determined whether or not the timer value TMDRDNJ2 of the second OD-side determination timer is equal to or larger than a predetermined OD-time DRDN-side reference value TDRDNJD2 (corresponding to e.g. 15 seconds).

If the answer to this question is negative (NO), the steps 169 and 157 are executed, followed by terminating the present process. On the other hand, if the answer to the above question is affirmative (YES), i.e. if a state in which no significant slippage of the belt 24 is occurring, and the engine torque TQEG is relatively small or the throttle valve opening TH is not very large has continued for a predetermined time period corresponding to the predetermined OD-time DRDN-side reference value TDRDNJD2 or longer, the process proceeds to a step 166, wherein the timer value TMDRDNJD of the first OD-side determination timer is set to 0.

Then, the process proceeds to a step 167, wherein so as to indicate that there has occurred at least one of the fixation of the DR solenoid valve 26b in the fully-open state and the fixation of the DN solenoid valve 27b in the fully-closed state, the OD-time DRDN failure flag F_FSKDRDNC is set to 1, and at the same time the above three failure flags F_FSKDR, F_FSKDN, and F_FSKDRDNB are all set to 0. Then, the steps 156 and 157 are executed as described above, followed by terminating the present process.

Figure 18:
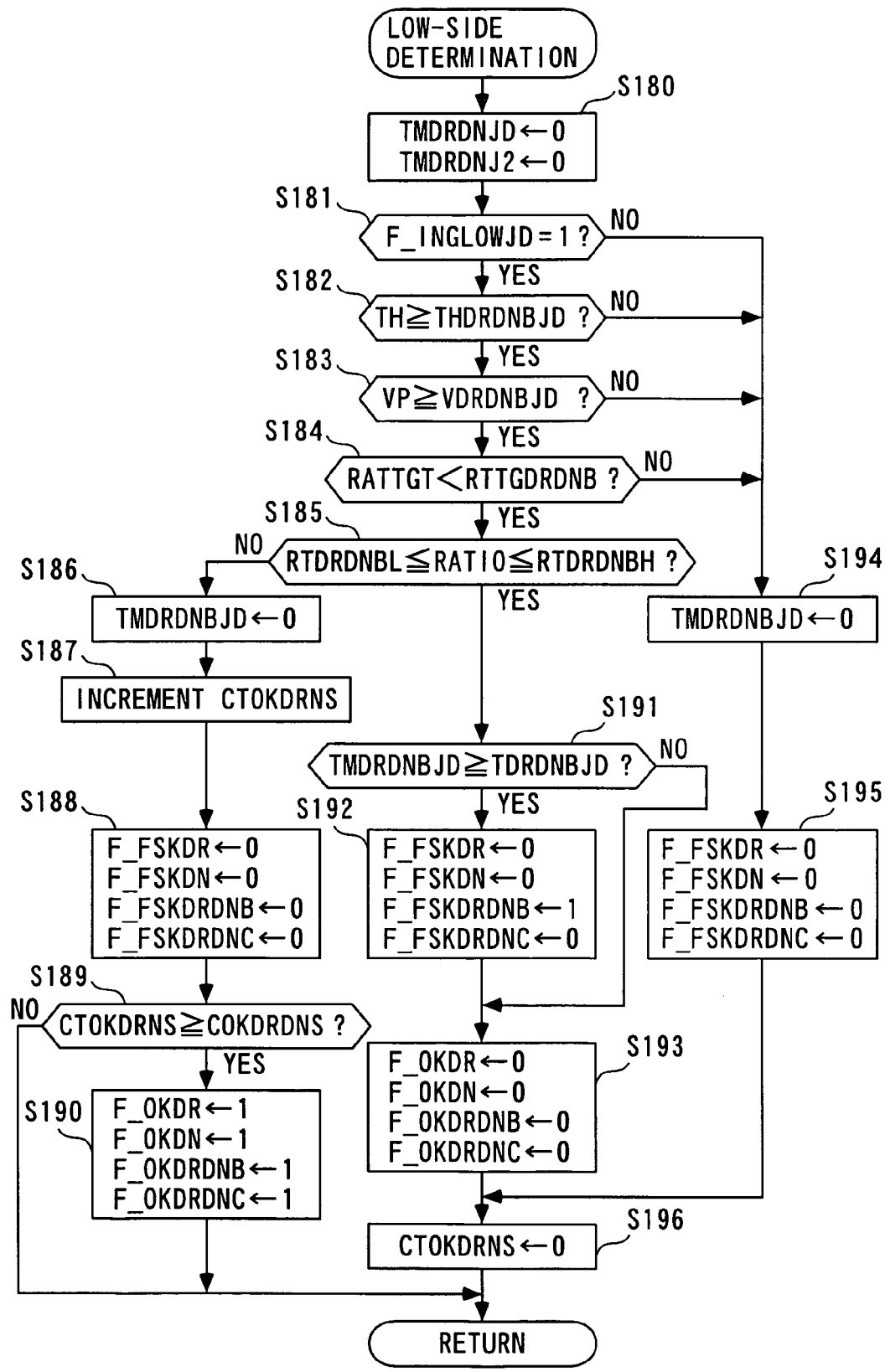
FIG. 18 is a flowchart showing a subroutine carried out for a LOW-side determining process.

Next, the LOW-side determining process at the step 125 will be described with reference to FIG. 18. This process is for determining whether or not the DR solenoid valve 26b and the DN solenoid valve 27b are both normal, or whether or not there has occurred at least one of the fixation of the DR solenoid valve 26b in the fully-closed state and the fixation of the DN solenoid valve 27b in the fully-open state. More specifically, the LOW-side determining process is carried out as follows:

First, in a step 180, both of the respective timer values TMDRDNJD and TMDRDNJ2 of the first OD-side determination timer and second OD-side determination timer are set to 0. Then, the process proceeds to a step 181, wherein it is determined whether or not the stop-time LOW-side flag F_INGLOWJD set by the stop-time transmission ratio determining process is equal to 1.

If the answer to this question is negative (NO), i.e. if the transmission ratio RATIO is not in the stop-time LOW-side range (RTINGLO≦RATIO≦RTINGLOH), the process proceeds to a step 194, wherein the timer value TMDRDNBJD of the LOW-side determination timer is set to 0.

Next, the process proceeds to a step 195, wherein the above four failure flags F_FSKDR, F_FSKDN, F_FSKDRDNB, and F_FSKDRDNC are all set to 0. Then, the process proceeds to a step 196, wherein the timer value CTOKDRNS of the DRDN normality provisional determination counter is set to 0, followed by terminating the present process.

On the other hand, if the answer to the question of the step 181 is affirmative (YES), i.e. if the transmission ratio RATIO is in the stop-time LOW-side range, which means that RTINGLOL≦RATIO≦RTINGLOH holds, the process proceeds to a step 182, wherein it is determined whether or not the throttle valve opening TH is equal to or larger than a predetermined LOW-side reference value THDRDNBJD (e.g. 5%).

If the answer to this question is negative (NO), i.e. if the accelerator pedal is not stepped on by the driver, causing the throttle valve to be almost fully closed, the steps 194 to 196 are executed as described above, followed by terminating the present process. On the other hand, if the answer to the question of the step 182 is affirmative (YES), which means that the accelerator pedal is stepped on by the driver, causing the throttle valve to be open, the process proceeds to a step 183, wherein it is determined whether or not the vehicle speed VP is equal to or higher than a predetermined LOW-side reference value VDRDNBJD (predetermined vehicle speed: e.g. 15 km/h).

If the answer to this question is negative (NO), i.e. if the vehicle speed VP is low, the steps 194 to 196 are executed as described above, followed by terminating the present process. On the other hand, if the answer to the above question is affirmative (YES), i.e. if the vehicle speed VP is not low, the process proceeds to a step 184, wherein it is determined whether or not the target transmission ratio RATTGT is lower than a predetermined LOW-side reference value RTTGDRDNB (e.g. 1.5).

If the answer to this question is negative (NO), i.e. if the target transmission ratio RATTGT has not been changed from the LOW side to the OD side, the steps 194 to 196 are carried out as described above, followed by terminating the present process. On the other hand, if the answer to the above question is affirmative (YES), i.e. if the target transmission ratio RATTGT has been changed from the LOW side to the OD side, the process proceeds to a step 185, wherein it is determined whether or not the transmission ratio RATIO is within a predetermined fixation determining LOW-side range (low-speed range). The fixation determining LOW-side range (RTDRDNBL≦RATIO≦RTDRDNBH) is set to the same range as the stop-time LOW-side range, as described hereinbefore. More specifically, the upper and lower limit values RTDRDNBH and RTDRDNBL are set to the same values as the LOW-side upper and lower limit values RTINGLOH and RTINGLOL, respectively. It should be noted that the fixation determining LOW-side range may be set to a range wider or narrower than the stop-time LOW-side range.

If the answer to the question of the step 185 is negative (NO), i.e. if the transmission ratio RATIO is not in the fixation determining LOW-side range, it is judged that the DR solenoid valve 26b and the DN solenoid valve 27b are both normal, so that the process proceeds to a step 186, wherein the timer value TMDRDNBJD of the LOW-side determination timer is set to 0, and then to a step 187, wherein the timer value CTOKDRNS of the DRDN normality provisional determination counter is incremented by 1.

Then, the process proceeds to a step 188, wherein the above four failure flags F_FSKDR, F_FSKDN, F_FSKDRDNB, and F_FSKDRDNC are all set to 0. Thereafter, the process proceeds to a step 189, wherein it is determined whether or not the timer value CTOKDRNS of the DRDN normality provisional determination counter is equal to or larger than a predetermined DRDN normality reference value COKDRDNS (e.g. 1500).

If the answer to this question is negative (NO), the present process is immediately terminated. On the other hand, if the answer to the question is affirmative (YES), i.e. if a state in which both of the DR solenoid valve 26b and the DN solenoid valve 27b can be regarded as normal has been detected a predetermined number (equal to the value of COKDRDNS) of times or more, the process proceeds to a step 190, wherein the aforementioned four normality flags F_OKDN, F_OKDR, F_OKDRDNB, and F_OKDRDNC are all set to 1 to indicate that both of the DR solenoid valve 26b and the DN solenoid valve 27b are normal, followed by terminating the present process.

On the other hand, if the answer to the question of the step 185 is affirmative (YES), i.e. if the transmission ratio RATIO is in the fixation determining LOW-side range (RTDRDNBL≦RATIO≦RTDRDNBH), it is judged that there has occurred at least one of the fixation of the DR solenoid valve 26b in the fully-closed state and the fixation of the DN solenoid valve 27b in the fully-open state, so that the process proceeds to a step 191, wherein it is determined whether or not the timer value TMDRDNBJD of the LOW-side determination timer is equal to or larger than a predetermined failure reference value TDRDNBJD (corresponding to e.g. 10 seconds).

If the answer to this question is negative (NO), the present process proceeds to a step 193, wherein the aforementioned four normality flags F_OKDN, F_OKDR, F_OKDRDNB, and F_OKDRDNC are all set to 0. Then, the step 196 is executed, followed by terminating the present process.

On the other hand, if the answer to the question of the step 191 is affirmative (YES), i.e. if a state, in which at least one of the fixation of the DR solenoid valve 26b in the fully-closed state and the fixation of the DN solenoid valve 27b in the fully-open state can be regarded as occurring, has continued for a predetermined time period (corresponding to the predetermined failure reference value TDRDNBJD) or longer, the process proceeds to a step 192, wherein to indicate that there has occurred at least one of the fixation of the DR solenoid valve 26b in the fully-closed state and the fixation of the DN solenoid valve 27b in the fully-open state, the LOW-time DRDN failure flag F_FSKDRDNB is set to 1, and at the same time the above-mentioned three failure flags F_FSKDR, F_FSKDN, and F_FSKDRDNC are all set to 0. Then, the steps 193 and 196 are executed as described above, followed by terminating the present process.

Figure 13:
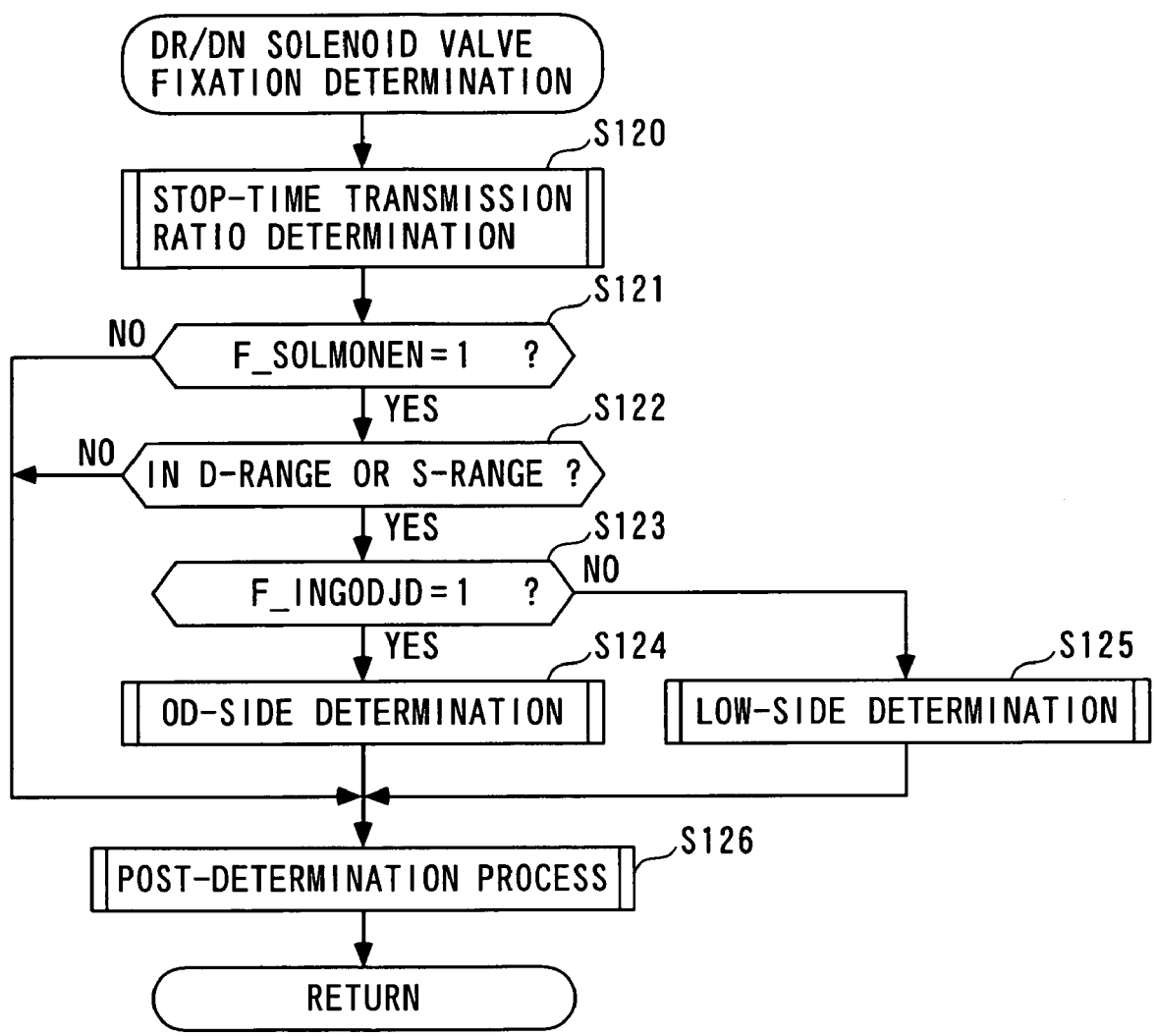
FIG. 13 is a flowchart showing a subroutine carried out for a fixation determining process for determining fixation of a DR solenoid valve and a DN solenoid valve.

As described in detail heretofore, in the FIG. 13 fixation determining process for determining whether fixation of any of the DR solenoid valve 26b and the DN solenoid valve 27b has occurred, the determination is carried out based on the transmission ratio RATIO, the throttle valve opening TH, the engine torque TQEG, the vehicle speed VP, and so forth. This is based on the following logic:

In the continuously variable transmission 20 according to the present embodiment, when the vehicle 3 is standing, the transmission ratio RATIO is controlled to be in the fixation determining LOW-side range (RTDRDNBL≦RATIO≦RTDRDNBH). Therefore, in the FIG. 14 stop-time transmission ratio determining process, if the transmission ratio RATIO is in the stop-time LOW-side range (RTINGLOL≦RATIO≦RTINGLOH), it is presumed that the DR solenoid valve 26b and the DN solenoid valve 27b are both normal. Further, if both of the DR solenoid valve 26b and the DN solenoid valve 27b are actually normal, when the target transmission ratio RATTGT is changed, after the standing start of the vehicle 3, to the OD side as indicated by a broken line in FIG. 19, the actual transmission ratio RATIO as well should be changed such that it follows the change in the target transmission ratio.

In contrast, if the answers to the questions of the steps 181 to 185 are all affirmative (YES), which means that the throttle valve is open (TH≧THDRDNBJD), the vehicle has been started (VP≧VDRDNBJD), and at the same time, in spite of the target transmission ratio RATTGT having been changed from the LOW side to the OD side (RATTGT<RTTGDRDNB), the transmission ratio RATIO is in the fixation determining LOW-side range as indicated by a solid line in FIG. 19, it is possible to presume occurrence of the following state: irrespective of shortage of oil pressure from the hydraulic circuit 28, the drive pulley 22 is held at the LOW-side wide width of the belt groove owing to the fixation of the DR solenoid valve 26b in the fully-closed state, which inhibits the supply of oil pressure to the DR oil chamber 26a, or alternatively the driven pulley 23 is held at the LOW-side narrow width of the belt groove, owing to the fixation of the DN solenoid valve 27b in the fully-open state, which causes continued supply of oil pressure to the DN oil chamber 27a.

Therefore, when such a state has continued for the predetermined time period corresponding to the predetermined failure reference value TDRDNBJD (between t1 to t2) or longer, it can be determined that the transmission ratio RATIO is not changed but held in the above LOW-side range due to the fixation of the DR solenoid valve 26*b* in the fully-closed state and/or the fixation of the DN solenoid valve 27*b* in the fully-open state (F_FSKDRDNJB←1).

Further, in the FIG. 14 stop-time transmission ratio determining process, when the transmission ratio RATIO during stoppage of the vehicle 3 is within the stop-time OD-side range (RTINGODL≦RATIO≦RTINGODH), it can be presumed that there has occurred the following state: Irrespective of shortage of oil pressure from the hydraulic circuit 28, the drive pulley 22 is held at the OD-side narrow width of the belt groove owing to the fixation of the DR solenoid valve 26*b* in the fully-open state, which causes continued supply of oil pressure to the DR oil chamber 26*a*, or alternatively the driven pulley 23 is held at the OD-side wide width of the belt groove owing to the fixation of the DN solenoid valve 27*b* in the fully-closed state, which inhibits the supply of oil pressure to the DN oil chamber 27*a*.

Figure 20:
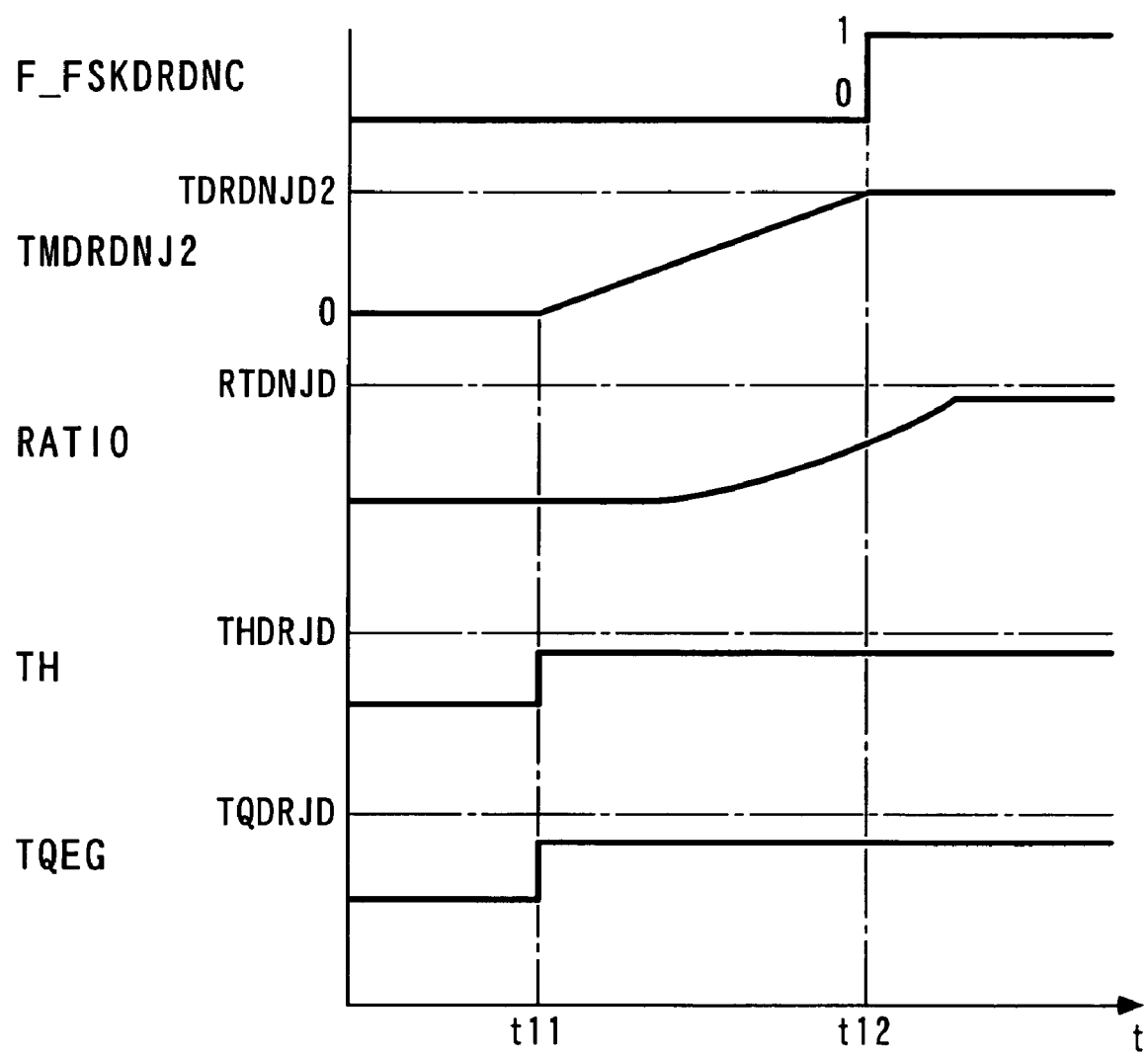
FIG. 20 is a timing chart showing an example of operations executed in a case where at least one of fixation of the DR solenoid valve in the fully-open state and fixation of the DN solenoid valve in the fully-closed state has occurred when the transmission ratio RATIO during stoppage of the vehicle is within a stop-time OD-side range.

Further, in the case where the transmission ratio RATIO during stoppage of the vehicle 3 is within the stop-time OD-side range, as shown in FIG. 20, after-the start of the vehicle 3, when the engine torque TQEG is not very large (TQEG<TQDRJD), or when the throttle valve opening TH is not very large (TH<THDRJD), the urging force of the return spring prevents occurrence of a significant slippage between the drive pulley 22 and the belt 24 or between the driven pulley 23 and the belt 24, thereby enabling the vehicle 3 to travel. Therefore, although it is impossible to determine whether the DR solenoid valve 26*b* is fixed in the fully-open state or whether the DN solenoid valve 27*b* is fixed in the fully-closed state, it is possible to presume that at least one of the solenoid valves is fixed irrespective of shortage of oil pressure from the hydraulic circuit 28.

Therefore, when such a state has continued for the predetermined time period corresponding to the predetermined reference value TDRDNJD2 (between t11 to t12) or longer, it is possible to determine that there has occurred at least one of the fixation of the DR solenoid valve 26*b* in the fully-open state and the fixation of the DN solenoid valve 27*b* in the fully-closed state (F_FSKDRDNC←1) irrespective of shortage of oil pressure from the hydraulic circuit 28.

Figure 21:
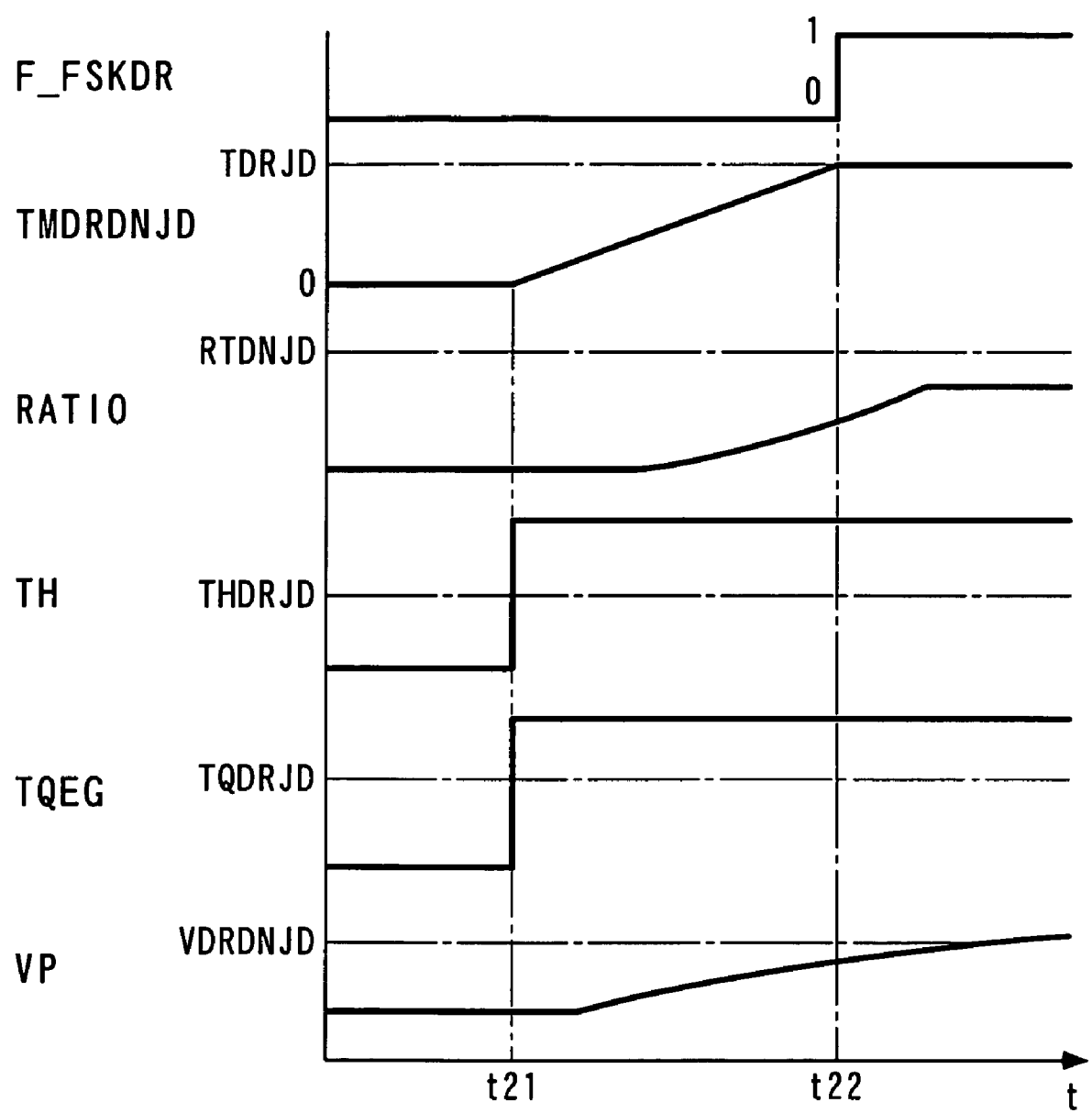
FIG. 21 is a timing chart showing an example of operations executed in a case where only the fixation of the DR solenoid valve in the fully-open state has occurred when the transmission ratio RATIO during stoppage of the vehicle is within the stop-time OD-side range.

Further, in the case where the transmission ratio RATIO during stoppage of the vehicle 3 is within the stop-time OD-side range, as shown in FIG. 21, after the start of the vehicle 3, when the transmission ratio RATIO is not changed from the OD side to the LOW side (RATIO<RTDNJD) in spite of the engine torque TQEG being considerably large (TQEG≧TQDRJD), it can be presumed that no slippage is occurring between the drive pulley 22 and the belt 24 or between the driven pulley 23 and the belt 24 although torque input to the drive pulley 22 is large. Such a state does not occur even when the driven pulley 23 is actuated to the OD-side wide width due to the fixation of the DN solenoid valve 27*b* in the fully-closed state, or even when oil pressure from the hydraulic circuit 28 is not sufficient, so long as the DR solenoid valve 26*b* is normal, since the transmission ratio RATIO is changed to a value on the LOW side, but occurs only when the DR solenoid valve 26*b* is fixed in the fully-open state.

Therefore, when such a state has continued for the predetermined time period corresponding to the predetermined DR-side reference value TDRJD (between t21 to t22) or longer, it is possible to determine that the DR solenoid valve 26*b* is fixed in the fully-open state (F_FSKDR←1) irrespective of shortage of oil pressure from the hydraulic circuit 28. In short, the failure of the DR solenoid valve 26*b* can be identified.

Figure 22:
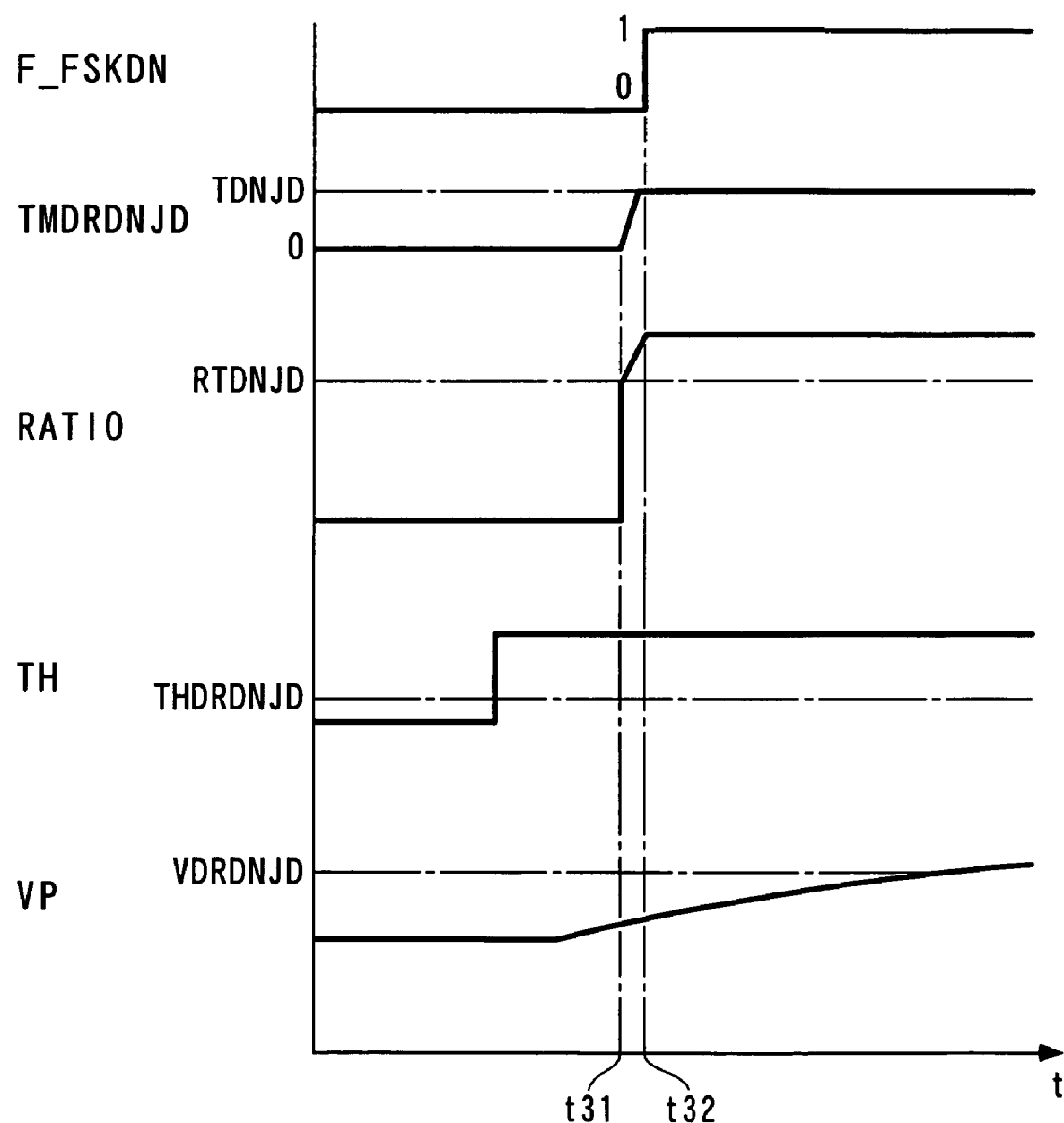
FIG. 22 is a timing chart showing an example of operations executed in a case where only the fixation of the DN solenoid valve in the fully-closed state has occurred when the transmission ratio RATIO during stoppage of the vehicle is within the stop-time OD-side range.

Further, in the case where the transmission ratio RATIO during stoppage of the vehicle 3 is within the stop-time OD-side range, as shown in FIG. 22, in spite of the throttle valve being open (TH≧THDRDNJD), if the vehicle speed VP remains low (VP<VDRDNJD), and at the same time the transmission ratio RATIO is changed from the OD side to a considerably high value on the LOW side (RATIO≧RTDNJD), it can be presumed that oil pressure is not supplied to the DN oil chamber 27*a* due to the fixation of the DN solenoid valve 27*b* in the fully-closed state irrespective of shortage of oil pressure from the hydraulic circuit 28, causing a significant slippage of the belt 24 between the driven pulley 23 and the belt 24.

Therefore, when such a state has continued for the predetermined time period corresponding to the predetermined DN-side reference value TDNJD (between t31 to t32) or longer, it is possible to determine that the DN solenoid valve 27*b* is fixed in the fully-closed state (F_FSKDN←1) irrespective of shortage of oil pressure from the hydraulic circuit 28. In short, the failure of the DN solenoid valve 27*b* can be identified.

As described hereinbefore, according to the failure determination system 1 of the present embodiment, it is possible to determine whether or not there has occurred at least one of the fixation of the DR solenoid valve 26*b* in the fully-open/fully-closed state, and the fixation of the DN solenoid valve 27*b* in the fully-open/fully-closed state, irrespective of shortage of oil pressure from the hydraulic circuit 28. Additionally, when the conditions shown in FIG. 21 or FIG. 22 are satisfied, the failure of the DR solenoid valve 26*b* or the DN solenoid valve 27*b* can be identified, which makes it possible to easily repair the continuously variable transmission 20 simply by replacing the DR solenoid valve 26*b* or the DN solenoid valve 27*b*, and thereby enhance maintainability of the continuously variable transmission 20.

It should be noted that the present embodiment is a case in which the crank angle sensor 40 is employed as the rotational speed parameter-detecting means, this is no limitative, but the rotational parameter-detecting means may be implemented by any suitable device that can detect the rotational speed parameter indicative of the rotational speed of the power source, such as the engine 4. For example, in place of the crank angel sensor 30, the drive-pulley rotational speed sensor 44 or the driven-pulley rotational speed sensor 45 may be employed as the rotational speed parameter-detecting means. In this case, although in the present embodiment, to discriminate between the travel incapability state owing to the failure of the SC solenoid valve 33*b* and the hill-climbing of the vehicle 3, in the step 20, the first travel incapability reference value NERUNNG is calculated, and in the step 28, it is determined whether or not the engine speed NE is equal to or higher than the first travel incapability reference value NERUNNG, in place of these operations, it is only required to perform the following operations:

In the step 20, a travel incapability reference value NDRRUNNG is calculated according to the throttle valve opening TH, and in the step 28, it is determined whether or not the drive-pulley rotational speed NDR is equal to or higher than the travel incapability reference value NDRRUNNG. If the answer to this question is affirmative (YES), similarly to the embodiment described above, it is only required to execute the step 29 et seq. Further, in place of the drive-pulley rotational speed NDR, the transmission ratio RATIO or the driven-pulley rotational speed NDN may be employed. More spefieailly, in the step 20, a travel incapability reference value RATRUNNG (or NDN-RUNNG) is calculated according to the throttle valve opening TH, and in the step 28, it is determined whether or not the transmission ration RATIO (or the driven-pulley rotational speed NDN) is equal to or higher than the travel incapability reference value RATRUNNG (or NDNRUNNG). If the answer to this question is affirmative (YES), similarly to the embodiment described above, it is only required to execute the step 29 et seq. As described above, the travel incapability referncde values NDRRUNNG, RATRUNNG, and NDNRUNNG are each set as a value equivalent to the first travel incapability reference value NERUNNG.

It should be noted that the drive source is not limited to the engine 4 employed in the embodiment, but any electric motor or other suitable means may be employed as the drive source so long as it generates power. Further, in the case of an electric motor being employed as the drive source, the rotational speed of the rotational shaft of the electric motor may be directly detected by a sensor, or may be estimated by detecting a current value indicative of the rotational speed of the electric motor. Further, as the failure determination process for the SC solenoid valve 33b, a process for determining an electric fault (a disconnection or a short circuit) of the solenoid of the SC solenoid valve 33b may be carried out separately from the failure determination process executed in the above-described embodiment. With this configuration, it is possible to discriminate the fixation of the valve element of the SC solenoid valve 33b from the electric fault, thereby making it possible to locate a faulty part of the SC solenoid valve 33b. Further, as the failure determining process for determining the failure of any of the two solenoid valves 26b and 27b, a process for determining an electric fault (a disconnection or a short circuit) of the solenoids of the two solenoid valves 26b and 27b may be carried out separately from the FIG. 13 fixation determining process executed in the embodiment. With this configuration, it is possible to discriminate the fixation of the valve element of the solenoid valve 26b or 27b from the electric fault, thereby making it possible to locate a faulty part of the solenoid valve 26b or 27b.

The control valve for the start clutch is not limited to the SC solenoid valve 33b employed in the embodiment, but any suitable control valve may be employed so long as it is capable of controlling the oil pressure to be supplied to the start clutch 30. Further, the drive-side control valve and the driven-side control valve are not limited to the DR solenoid valve 26b and the DN solenoid valve 27b employed in the embodiment, but any valves may be used as the control valves so long as they are capable of controlling oil pressures supplied to the DR oil chamber 26a for the drive pulley 22 and the DN oil chamber 27a for the driven pulley 23. For example, as the control valve for the start clutch, the drive-side control valve and the driven-side control valve, electric motor valves may be used or mechanical valves (e.g. spool valves) whose valve openings are controlled by control pressures supplied thereto may be used.

Further, although in the embodiment, the transmission ratio RATIO, which is a ratio between the rotational speeds of the drive pulley 22 and the driven pulley 23, is calculated in the state where the rotation of the engine 4 is transmitted during stoppage of the vehicle 3 up to the continuously variable transmission 20 via the forward/backward travel-switching mechanism 10 and at the same time the continuously variable transmission 20 is disconnected from the drive wheels 7 by the start clutch 30, and the failure of the solenoid valves 26b and 27b is determined based on the transmission ratio RATIO calculated during stoppage of the vehicle 3, this not limitative, but the failure determination system 1 according to the present invention can be applied to a vehicle without the start clutch 30 between the continuously variable transmission 20 and the start clutch 30, which during stoppage of the vehicle, torque transfer from the engine 4 to the continuously variable transmission 20 is inhibited by slippage of a clutch or a torque converter arrange between the continuously variable transmission 20 and the engine 4. In such a case, it is only required that a value of the transmission ratio RATIO calculated immediately before stoppage of the vehicle is used in place of a value of the same calculated during stoppage thereof, to thereby execute determination of failure of the solenoid valves 26 and 27b similarly to the embodiment.

Further, the vehicle start operation-detecting means is not limited to the throttle valve opening sensor 41 employed in the embodiment, but the accelerator opening sensor or any other suitable means may be used so long as it is capable of detecting the start operation of the vehicle 3.

Also, the transmission is not limited to the continuously variable transmission 20 employed in the embodiment, but any suitable transmission that performs speed varying operation may be employed. For example, it is possible to employ an automatic transmission of a torque converter type, or a so-called automatic MT in which an electromagnetic force instead of a manual operating force performs the speed varying operation.

It is further understood by those skilled in the art that the foregoing is a preferred embodiment of the present invention, and that various changes and modifications can be made without departing from the spirit and scope thereof.

What is claimed is:

1. A failure determination system for a continuously variable transmission including a drive pulley which has torque input from a drive source of a vehicle, and whose pulley width is reduced by supply of oil pressure, a driven pulley which is connected to the drive pulley via a belt, and whose pulley width is reduced by supply of oil pressure, and a drive-side control valve and a driven-side control valve that control the oil pressure supplied from a hydraulic system to the drive pulley and the driven pulley, respectively, so as to carry out speed varying operation, the failure determination system determining failure of any of the drive-side control valve and the driven-side control valve, the failure determination system comprising:

transmission ratio-detecting means for detecting a transmission ratio between the drive pulley and the driven pulley;

vehicle speed-detecting means for detecting a vehicle speed of the vehicle; and failure-determining means for determining failure of at least one of the drive-side control valve and the driven-side control valve, based on the transmission ratio detected at one of a time during stoppage of the vehicle and a time immediately before the stoppage of the vehicle, the transmission ratio detected after a restart of the vehicle after the stoppage, and the detected vehicle speed.

2. A failure determination system as claimed in claim 1, wherein the transmission ratio at one of the time during stoppage of the vehicle and the time immediately before the stoppage of the vehicle is set to a value within a predetermined low-speed range, and wherein when the transmission ratio detected at the one of the time during stoppage of the vehicle and the time immediately before the stoppage of the vehicle is within the predetermined low-speed range, and at the same time the vehicle speed is increased to a predetermined vehicle speed or higher after the restart of the vehicle after the stoppage, unless the transmission ratio is reduced to a value lower than the predetermined low-speed range, said failure-determining means determines that there has occurred at least one of a failure in which the drive-side control valve is fixed in a state where the drive-side control valve has stopped the supply of oil pressure to the drive pulley, and a failure in which the driven-side control valve is fixed in a state where the driven-side control valve continues the supply of oil pressure to the driven pulley.

3. A failure determination system as claimed in claim 1, wherein the transmission ratio at one of the time during stoppage of the vehicle and the time immediately before the stoppage of the vehicle is set to a value within a predetermined low-speed range, and wherein when the transmission ratio detected at one of the time during stoppage of the vehicle and the time immediately before the stoppage of the vehicle is within a predetermined high-speed range lower than the predetermined low-speed range, said failure-determining means determines that there has occurred at least one of a failure in which the drive-side control valve is fixed in a state where the drive-side control valve continues the supply of oil pressure to the drive pulley, and a failure in which the driven-side control valve is fixed in a state where the driven-side control valve has stopped the supply of oil pressure to the driven pulley.

4. A failure determination system as claimed in claim 3, further comprising start operation-detecting means for detecting start operation of the vehicle, wherein when the transmission ratio detected at one of the time during stoppage of the vehicle and the time immediately before the stoppage of the vehicle is within the predetermined high-speed range lower than the predetermined low-speed range, and at the same time the start operation of the vehicle is detected, if the transmission ratio is increased to a value equal to or higher than a predetermined low-speed transmission ratio higher than the predetermined high-speed range, and at the same time the vehicle speed is lower than a second predetermined vehicle speed, said failure-determining means determines that there has occurred the failure in which the driven-side control valve is fixed in the state where the driven-side control valve has stopped the supply of oil pressure to the driven pulley.

5. A failure determination system for a continuously variable transmission including a drive pulley which has torque input from a drive source of a vehicle, and whose pulley width is reduced by supply of oil pressure, a driven pulley which is connected to the drive pulley via a belt, and whose pulley width is reduced by supply of oil pressure, and a drive-side control valve and a driven-side control valve that control the oil pressure supplied from a hydraulic system to the drive pulley and the driven pulley, respectively, so as to carry out speed varying operation, the failure determination system determining failure of any of the drive-side control valve and the driven-side control valve, wherein a transmission ratio between the drive pulley and the driven pulley at one of a time during stoppage of the vehicle and a time immediately before the stoppage of the vehicle is set to a value within a predetermined low-speed range, the failure determination system comprising:

transmission ratio-detecting means for detecting the transmission ratio;

torque-detecting means for detecting torque input to the drive pulley; and failure-determining means for determining that there has occurred a failure in which the drive-side control valve is fixed in a state where the drive-side control valve continues the supply of oil pressure to the drive pulley, on condition that the transmission ratio at the one of the time during stoppage of the vehicle and the time immediately before the stoppage of the vehicle is within a predetermined high-speed range lower than the predetermined low-speed range, that the torque detected by said torque-detecting means after a restart of the vehicle after the stoppage is larger than a predetermined torque, and that the transmission ratio is not increased to a predetermined low-speed transmission ratio higher than the predetermined high-speed range, after the restart of the vehicle after the stoppage thereof.

6. A failure determination system for a hydraulically-controlled start clutch that is disposed between a transmission to which torque is input from a power source of a vehicle and drive wheels of the vehicle, for being engaged by supply of oil pressure thereto from a hydraulic system via a control valve, such that an engaging force of the start clutch is controlled according to an input command to the control valve, the failure determination system determining failure of the control valve, the failure determination system comprising:

vehicle start operation-detecting means for detecting a start operation of the vehicle;

vehicle speed-detecting means for detecting a vehicle speed of the vehicle;

rotational speed parameter-detecting means for detecting a rotational speed parameter indicative of a rotational speed of the power source; and failure-determining means for determining failure of the control valve based on a result of detection by said vehicle start operation-detecting means, the input command to the control valve, the detected vehicle speed, and the detected rotational speed parameter.

7. A failure determination system as claimed in claim 6, wherein said failure-determining means determines that the control valve is faulty, on condition that the vehicle starting operation has been detected, that a value of the input command to the control valve is within a predetermined range, that the detected vehicle speed is lower than a predetermined vehicle speed, and that the rotational speed parameter indicates that the rotational speed of the power source is equal to or higher than a predetermined value.

8. A failure determination system for a hydraulically-controlled start clutch that is installed on a vehicle, the start clutch being disposed between a continuously variable transmission of a belt type including a drive pulley which has torque input from a drive source of the vehicle, a driven pulley, and a belt stretched around the drive pulley and the driven pulley, and drive wheels of the vehicle, for being engaged by supply of oil pressure thereto from a hydraulic system via a control valve, such that an engaging force of the start clutch is controlled according to an input command to the control valve, the failure determination system determining failure of the control valve, the failure determination system comprising:

vehicle start operation-detecting means for detecting a start operation of the vehicle;

vehicle speed-detecting means for detecting a vehicle speed of the vehicle;

rotational speed parameter-detecting means for detecting a rotational speed parameter indicative of a rotational speed of the power source; and failure-determining means for determining failure of the control valve based on a result of detection by said vehicle start operation-detecting means, the input command to the control valve, the detected vehicle speed, and the detected rotational speed parameter.

9. A failure determination system as claimed in claim 8, wherein said failure-determining means determines that the control valve is faulty, on condition that the vehicle starting operation has been detected, that a value of the input command to the control valve is within a predetermined range, that the detected vehicle speed is lower than a predetermined vehicle speed, and that the rotational speed parameter indicates that the rotational speed of the power source is equal to or higher than a predetermined value.

* * * * *